(12) United States Patent
Murphy et al.

(10) Patent No.: US 12,553,643 B2
(45) Date of Patent: Feb. 17, 2026

(54) WATER HEATER DIP TUBE

(71) Applicants: A. O. Smith Corporation, Milwaukee, WI (US); A. O. Smith (China) Water Heater Co., Ltd., Nanjing (CN)

(72) Inventors: Mark Allan Murphy, Nashville, TN (US); Cui Yang, Nanjing (CN); Kaiju Chen, Nanjing (CN); Michael Styer, Burns, TN (US)

(73) Assignee: A. O. Smith Corporation, Milwaukee, WI (US)

( * ) Notice: Subject to any disclaimer, the term of this patent is extended or adjusted under 35 U.S.C. 154(b) by 351 days.

(21) Appl. No.: 18/257,034

(22) PCT Filed: Mar. 18, 2021

(86) PCT No.: PCT/CN2021/081531
§ 371 (c)(1),
(2) Date: Jun. 12, 2023

(87) PCT Pub. No.: WO2022/193228
PCT Pub. Date: Sep. 22, 2022

(65) Prior Publication Data
US 2024/0053058 A1 Feb. 15, 2024

(51) Int. Cl.
*F22D 7/04* (2006.01)
*F24H 9/13* (2022.01)

(52) U.S. Cl.
CPC .................................. *F24H 9/136* (2022.01)

(58) Field of Classification Search
CPC ..................................... F22D 7/00; F22D 7/04
See application file for complete search history.

(56) References Cited

U.S. PATENT DOCUMENTS

| | | | |
|---|---|---|---|
| 1,886,135 | A | 11/1932 | Tannehill |
| 3,285,241 | A | 11/1966 | Bordeaux |

(Continued)

FOREIGN PATENT DOCUMENTS

| | | | |
|---|---|---|---|
| CN | 103791619 A | 5/2014 | |
| CN | 209588392 U | 11/2019 | |

(Continued)

OTHER PUBLICATIONS

International Search Report and Written Opinion for Application No. PCT/CN2021/081531 dated Nov. 22, 2021. (9 pages).

(Continued)

*Primary Examiner* — Gregory A Wilson
(74) *Attorney, Agent, or Firm* — Michael Best & Friedrich LLP

(57) ABSTRACT

A water heater dip tube includes an elongated body having an inlet end and an outlet end. An inner volume is arranged within the elongated body. An anti-siphon orifice is arranged along the elongated body proximate the inlet end. The anti-siphon orifice extends through a wall of the elongated body. The dip tube further includes an elastomeric membrane secured to the elongated body. The elastomeric membrane is arranged in the vicinity of the anti-siphon orifice. The elastomeric membrane is operable to block fluid flow through the anti-siphon orifice when a pressure at the inlet end is greater than a pressure at the exterior of the dip tube adjacent to the anti-siphon orifice, and to allow fluid flow through the anti-siphon orifice when a pressure at the inlet end is less than a pressure at the exterior of the dip tube adjacent to the anti-siphon orifice.

16 Claims, 17 Drawing Sheets

(56) References Cited

U.S. PATENT DOCUMENTS

| | | | | |
|---|---|---|---|---|
| 3,726,475 | A | * | 4/1973 | Eising ............... F24H 9/133 |
| | | | | 236/102 |
| 3,776,456 | A | * | 12/1973 | Eising ............... F24H 9/133 |
| | | | | 236/102 |
| 4,964,394 | A | * | 10/1990 | Threatt ............. F24H 9/133 |
| | | | | 137/433 |
| 10,094,592 | B2 | * | 10/2018 | Lowdermilk ........ F24H 9/133 |
| 10,288,316 | B1 | * | 5/2019 | Currey ............... F24H 9/45 |
| 2012/0298213 | A1 | | 11/2012 | Forster et al. |
| 2017/0115030 | A1 | | 4/2017 | Lowdermilk et al. |

FOREIGN PATENT DOCUMENTS

| | | | |
|---|---|---|---|
| CN | 110864451 A | 3/2020 | |
| FR | 3018350 A1 * | 9/2015 | ............. H01H 36/02 |

OTHER PUBLICATIONS

International Preliminary Report on Patentability for Application No. PCT/CN2021/081531 dated Sep. 12, 2023 (5 pages).

\* cited by examiner

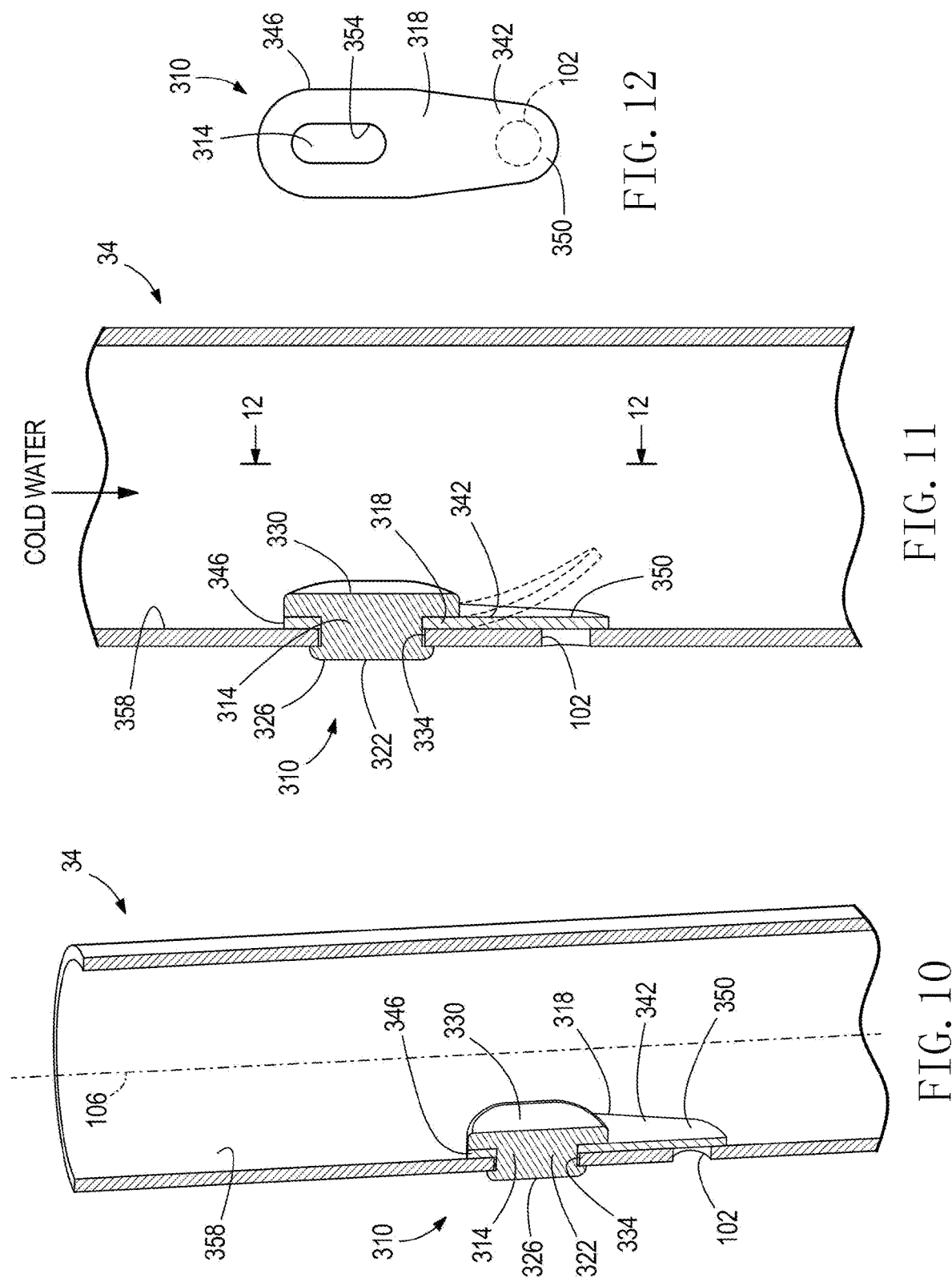

WATER HEATER DIP TUBE

BACKGROUND

The present invention relates to a tank-type water heater having a cold water egress prevention mechanism for an anti-siphon orifice of a dip tube of the water heater.

Tank-type water heaters include a dip tube that conveys cold water to a bottom portion of the tank. Regulations in many jurisdictions require that the dip tube includes an anti-siphon orifice proximate a top of the tank. The anti-siphon orifice is provided to prevent water in the tank from being drawn or siphoned out by the dip tube when water supply pressure decreases or is lost to the tank and/or a cold water supply. A hot water outlet is typically located at a top end of the tank, so that the water removed from the tank during a hot water draw is the hottest (and therefore, least dense) water within the tank. Cold water may enter a top portion of the tank by the anti-siphon orifice during a hot water draw, and can be drawn through the hot water outlet, thereby undesirably lowering the temperature of the water that is delivered.

SUMMARY

A cold water egress prevention mechanism is provided to minimize cold water entering the top portion of the tank by the anti-siphon orifice during a hot water draw. The cold water egress prevention mechanism is integrated with the dip tube. The cold water egress prevention mechanism is adapted to allow the anti-siphon orifice to still inhibit or prevent water in the tank from being drawn or siphoned out by the dip tube.

In one embodiment, the invention provides a water heater dip tube. The dip tube includes an elongated body having an inlet end and an outlet end. An inner volume is arranged within the elongated body and provides a first fluid flow path extending through the inner volume between the inlet end and the outlet end. An anti-siphon orifice is arranged along the elongated body proximate the inlet end. The anti-siphon orifice extends through a wall of the elongated body to provide a second fluid flow path between the inner volume and an exterior of the dip tube. The dip tube further includes an elastomeric membrane secured to the elongated body. The elastomeric membrane is arranged in the vicinity of the anti-siphon orifice. The elastomeric membrane is operable to block fluid flow through the anti-siphon orifice when a pressure at the inlet end is greater than a pressure at the exterior of the dip tube adjacent to the anti-siphon orifice, and to allow fluid flow through the anti-siphon orifice when a pressure at the inlet end is less than a pressure at the exterior of the dip tube adjacent to the anti-siphon orifice.

In another embodiment, the invention provides a water heater dip tube. The dip tube includes an elongated body having an inlet end and an outlet end. An inner volume is arranged within the elongated body and provides a fluid flow path extending through the inner volume between the inlet end and the outlet end. An anti-siphon orifice is arranged along the elongated body proximate the inlet end. The anti-siphon orifice extends through a wall of the elongated body. The dip tube further includes a flow channel forming part of the inner volume and connecting the anti-siphon orifice to a remainder of the inner volume. The flow channel is not along the fluid flow path. The flow channel is configured to prevent flow through the anti-siphon orifice when fluid is flowing along the fluid flow path from the inlet end to the outlet end and to allow flow through the anti-siphon orifice in the absence of fluid flow along the fluid flow path from the inlet end to the outlet end.

In yet another embodiment, the invention provides a water heater dip tube. The dip tube includes a first body portion providing an inlet end of the dip tube, a second body portion providing an outlet end of the dip tube, and a third body portion joined to the first body portion and the second body portion. A first end of the third body portion is received within the first body portion and a second end of the third body portion is received within the second body portion. The dip tube further includes an anti-siphon orifice extending through a wall of the second body portion. The anti-siphon orifice is located at a first distance from the inlet end. The second end of the third body portion extends to a second distance from the inlet end. The second distance is greater than the first distance.

Other aspects of the invention will become apparent by consideration of the detailed description and accompanying drawings.

BRIEF DESCRIPTION OF THE DRAWINGS

FIG. 10 is a cross-sectional view of a portion of a dip tube assembly including a cold water egress prevention mechanism according to a fourth embodiment, the cold water egress prevention mechanism including an elastomeric membrane.

FIG. 11 is a cross-sectional schematic view of another example of the portion of the dip tube assembly and the elastomeric membrane of FIG. 10.

FIG. 12 is a front view of the elastomeric membrane of FIG. 11.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 3:
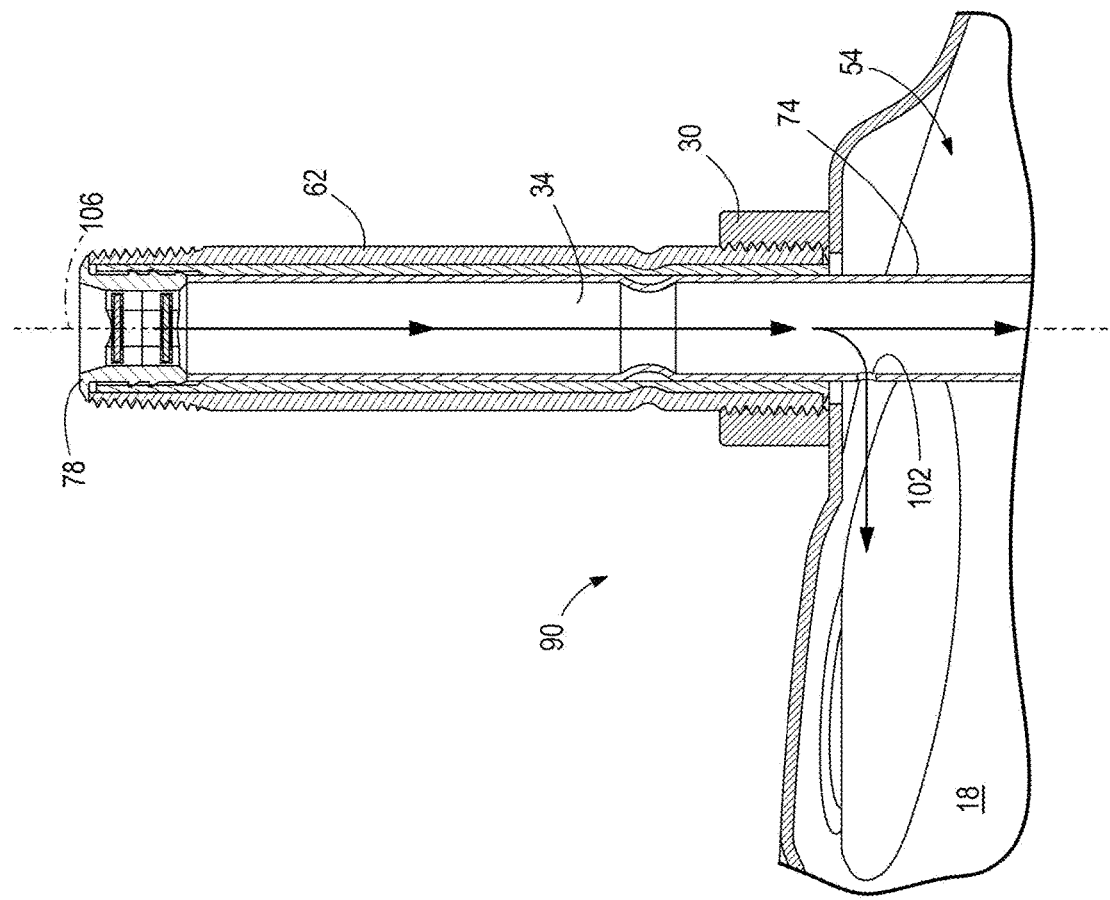
FIG. 3 is an enlarged cross-sectional view of a portion of a dip tube assembly of the water heater of FIG. 1.
Figure 1:
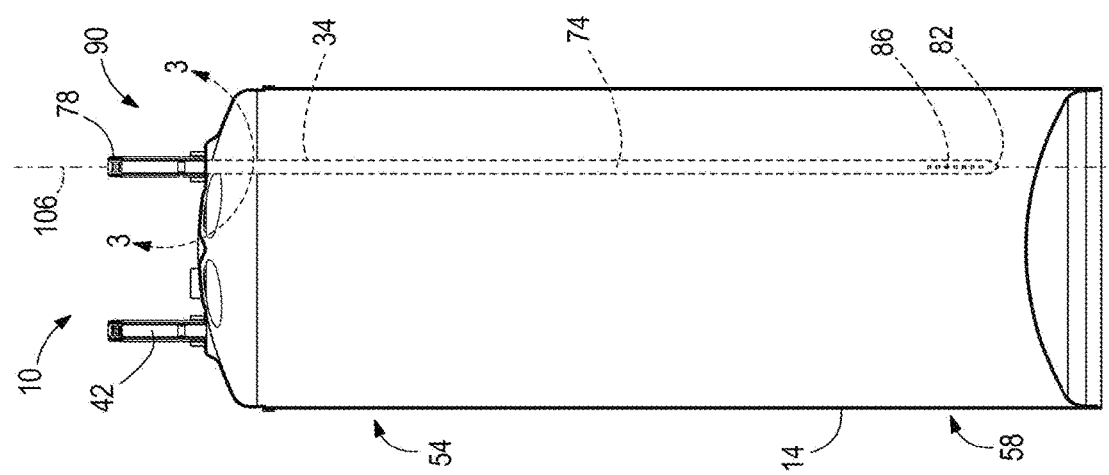
FIG. 1 is a side view of a tank-type water heater according to embodiments of the present invention.
Figure 2:
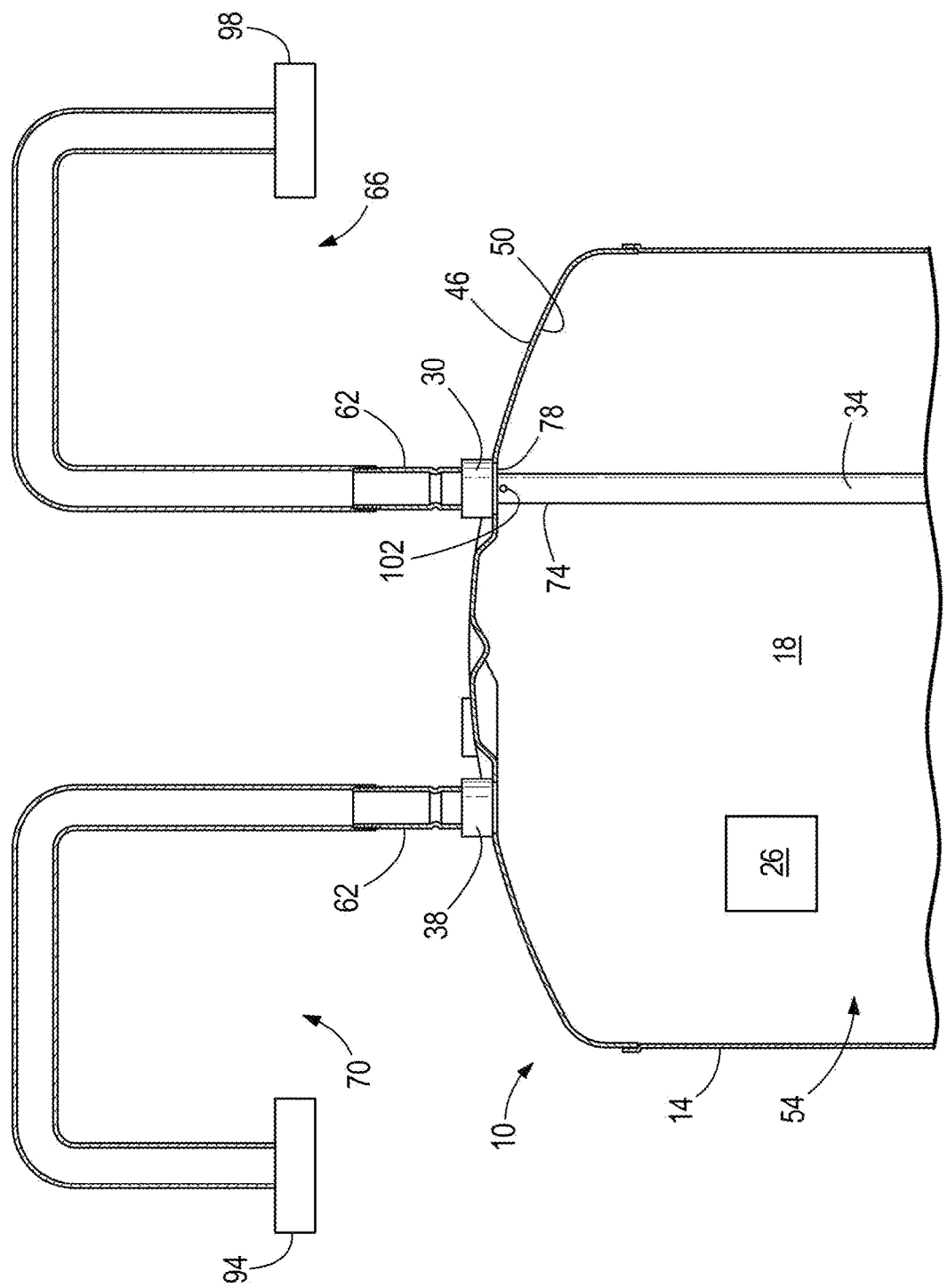
FIG. 2 is a cross-section of a top portion of the water heater of FIG. 1, and further including a hot water access point and a cold water supply.

With reference to FIGS. 1-3, a tank-type water heater 10 includes a tank 14 defining an interior space 18 for holding water, a heat source 26 for heating the water in the interior space 18, an inlet spud 30, a dip tube 34 extending into the interior space 18, and an outlet spud 38.

The tank 14 includes an upper head 46 that is dome-shaped with a concave side 50 facing into the interior space 18 (FIG. 2). The tank 14 and interior space 18 include a top portion 54 (a top boundary of which is defined by the concave side 50) and a lower portion 58. During ordinary operation of the water heater 10, water can only enter and exit the interior space 18 via the inlet spud 30 and the outlet spud 38. Other openings in the tank 14 (including but not limited to a drain, a temperature and pressure (T&P) relief valve spud, an anode spud, and an electric heating element spud or gas valve spud) are water-tightly closed during ordinary operation.

The heat source 26 is shown schematically in FIG. 2 and is intended to include a gas-fired burner in a combustion chamber with one or more flues extending through the interior space 18, one or more electric heating elements, the condenser of a heat pump, waste heat from another device, or any other device for generating heat and transferring the heat to the water in the tank 14. Embodiments of the present invention can include any combination of the example heat sources provided above, combined with each other or with any other suitable devices used as the heat source 26.

The inlet spud 30 and the outlet spud 38 are welded or otherwise permanently affixed to the upper head 46 (e.g., see FIG. 3). Each spud 30, 38 surrounds a hole in the upper head 46 and includes interior threads. A connector 62 such as a pipe nipple places the inlet and outlet spuds 30, 38 in communication with a cold water pipe 66 and a hot water pipe 70, respectively. In the illustrated embodiment, each of the cold water pipe 66 and the hot water pipe 70 includes interior threads (FIG. 2). The connector 62 includes exterior threads positioned at each end of the connector 62. The threads of the connector 62 are threaded to the interior threads of the respective spud 30, 38 (e.g., see FIG. 3), as well as the interior threads of the respective water pipe 66, 70 (e.g., FIG. 2). The dip tube 34 extends from the inlet spud 30 into the lower portion 58 of the water tank 14.

The inlet spud 30 and the outlet spud 38 are sealed with respect to the respective cold water and hot water pipes 66, 70 such that during ordinary operation of the water heater 10, water can only flow into and out of the interior space 18 through the inlet spud 30/dip tube 34 and outlet spud 38. In the exemplary embodiments of the invention, the dip tube 34 is supported by a crimp in the inlet connector 62 located above the spud 30. In other embodiments, the dip tube 34 can be supported in other suitable ways.

With reference to FIG. 1, the dip tube 34 includes an elongated body 74 extending between a first, inlet end 78 and a second, outlet end 82. In particular, the dip tube 34 includes the inlet end 78 coupled to the connector 62 and the outlet end 82 positioned in the lower portion 58 of the interior space 18. In addition, the dip tube 34 has an inner volume. The inner volume is arranged within the elongated body 74. The inner volume provides a fluid flow path extending through the inner volume from the inlet end 78 to the outlet end 82.

The dip tube 34 can be an open-ended tube with axial openings (i.e., openings that permit flow parallel to the longitudinal axis of the dip tube 34), transverse openings (i.e., openings that permit flow perpendicular to the respective longitudinal axes), or a combination of axial and transverse openings proximate the outlet end 82. As illustrated in FIG. 1, the dip tube 34 is vertically oriented (i.e., the longitudinal axis is vertical), and includes the transverse openings 86 such that incoming cold water is released in a direction perpendicular to the longitudinal axis of the dip tube 34. In other embodiments, the dip tube 34 includes a closed end with only transverse openings.

With reference to FIGS. 2 and 3, the tank 14 is initially filled via a dip tube assembly 90. The dip tube assembly 90 includes the dip tube 34, and the connector 62 (in the form of a pipe nipple) mechanically fixed to the inlet end 78 of the dip tube 34 (e.g., by way of crimps or the like). If desired, a dielectric or seal can be interposed between the connector 62 and the dip tube 34 to physically separate and seal between those components. In other embodiments, the dip tube assembly 90 may include other components such as the inlet spud 30, the cold water pipe 66, and/or may include only the dip tube 34.

With reference to FIG. 2, a hot water access point or point-of-use 94, such as a faucet or a water-consuming appliance, communicates with the hot water pipe 70. Cold water is supplied at supply pressure (usually around 30 psi but sometimes as high as 60 psi) from a cold water source 98 (e.g., a water utility or well pump) through the cold water pipe 66 and subsequently to the dip tube assembly 90. When the access point 94 is opened, the hot water pipe 70 is exposed to atmospheric pressure, which permits cold water to flow at supply pressure into the lower portion 58 of the tank 14 via the dip tube 34 and displace hot water from the interior space 18 of the tank 14 via the outlet spud 38 and hot water pipe 70. During standby (i.e., between hot water draws, when the access point 94 is closed), the heat source 26 heats the water in the tank 14 that has been cooled by introduction of cold water into the lower portion 58.

As illustrated in FIGS. 2-3, the dip tube assembly 90 further includes an anti-siphon hole or orifice 102. In particular, the dip tube 34 of the dip tube assembly 90 includes the anti-siphon orifice 102 extending through a wall of the elongated body 74 of the dip tube 34. The anti-siphon orifice 102 is arranged along the elongated body 74 of the dip tube 34 proximate the inlet end 78. In addition, when the dip tube 34 is installed, the anti-siphon orifice 102 is positioned in the interior space 18 of the tank 14 proximate the bottom of the inlet spud 30 and the connector 62. In other embodiments, the anti-siphon orifice 102 extends through a wall of an extension of the connector 62 (rather than the dip tube 34) proximate the inlet end 78 of the dip tube 34 (e.g., see FIG. 14).

With particular reference to FIG. 3, the dip tube assembly 90 includes a longitudinal axis 106 extending therethrough. The anti-siphon orifice 102 is a transverse opening in the dip tube 34 (i.e., allowing flow perpendicular to the longitudinal axis 106). More specifically, the anti-siphon orifice 102 communicates the inner volume of the elongated body 74 of the dip tube 34 with an exterior of the dip tube 34 (i.e., provides a secondary fluid flow path between the inner volume and the exterior of the dip tube 34).

During operation, cold water flows along the fluid flow path from the inlet end 78 of the dip tube 34 through the inner volume of the dip tube 34 toward the outlet end 82 along the longitudinal axis 106 (e.g., during hot water draws to replace the hot water being drawn from the tank 14). In addition, in the absence of any features to prevent it, some cold water can flow from the inner volume of the dip tube 34 along the secondary fluid flow path through the anti-siphon orifice 102 such that some cold water enters the top portion 54 of the interior space 18 and mixes with the hot water in the top portion 54. The cold water flowing through the anti-siphon 102 is generally perpendicular to the longitudinal axis 106.

The anti-siphon orifice 102 is provided to inhibit or prevent water within the tank 14 from being drawn back or siphoned into the cold water pipe 66 such as when water pressure is greatly decreased or lost to the tank 14 and/or the cold water pipe 66. When the water pressure at the inlet end 78 of the dip tube 34 is less than the pressure of an exterior of the tank 14, a vacuum is created thereby causing the dip tube 34 to draw water in the tank 14 from the outlet end 82 toward the inlet end 78 (i.e., opposite the fluid flow path). This may be referred to herein as a "siphoning event." The anti-siphon orifice 102 is positioned to halt the undesirable siphoning of water through the dip tube 34. During a siphoning event, water from the tank 14 will drain out through the cold water pipe 66, and will be replaced by air entering the tank 14 through the hot water pipe 70, such air entering through, for example, an open access point 94. Once air is drawn into the cold water pipe 66, the siphoning of water is halted. The air, being less dense than the water, will fill the interior space 18 of the tank 14 from the top. By locating the anti-siphon orifice 102 towards a top end of the tank 14, the vacuum created during a siphoning event will result in air from that top portion of the tank 14 being drawn through the anti-siphon orifice 102 toward the inlet end 78 of the dip tube 34 relatively soon after the siphoning event begins, leaving the tank 14 relatively full of water. In contrast, without the anti-siphon orifice 102, the siphoning event will continue until air has filled the interior space 18 from the top of the tank 14 to the outlet end 82 or the transverse openings 86 of the dip tube 34.

As further discussed in the embodiments described herein, the dip tube assembly 90 further includes a cold water egress prevention mechanism 110, 210, 310, 410, 510, 610, 810 for selectively minimizing or preventing cold water from entering the top portion 54 of the interior space 18 during a hot water draw by the anti-siphon orifice 102, but allows the air to enter the dip tube assembly 90 by the anti-siphon orifice 102 during a siphoning event.

Figure 4:
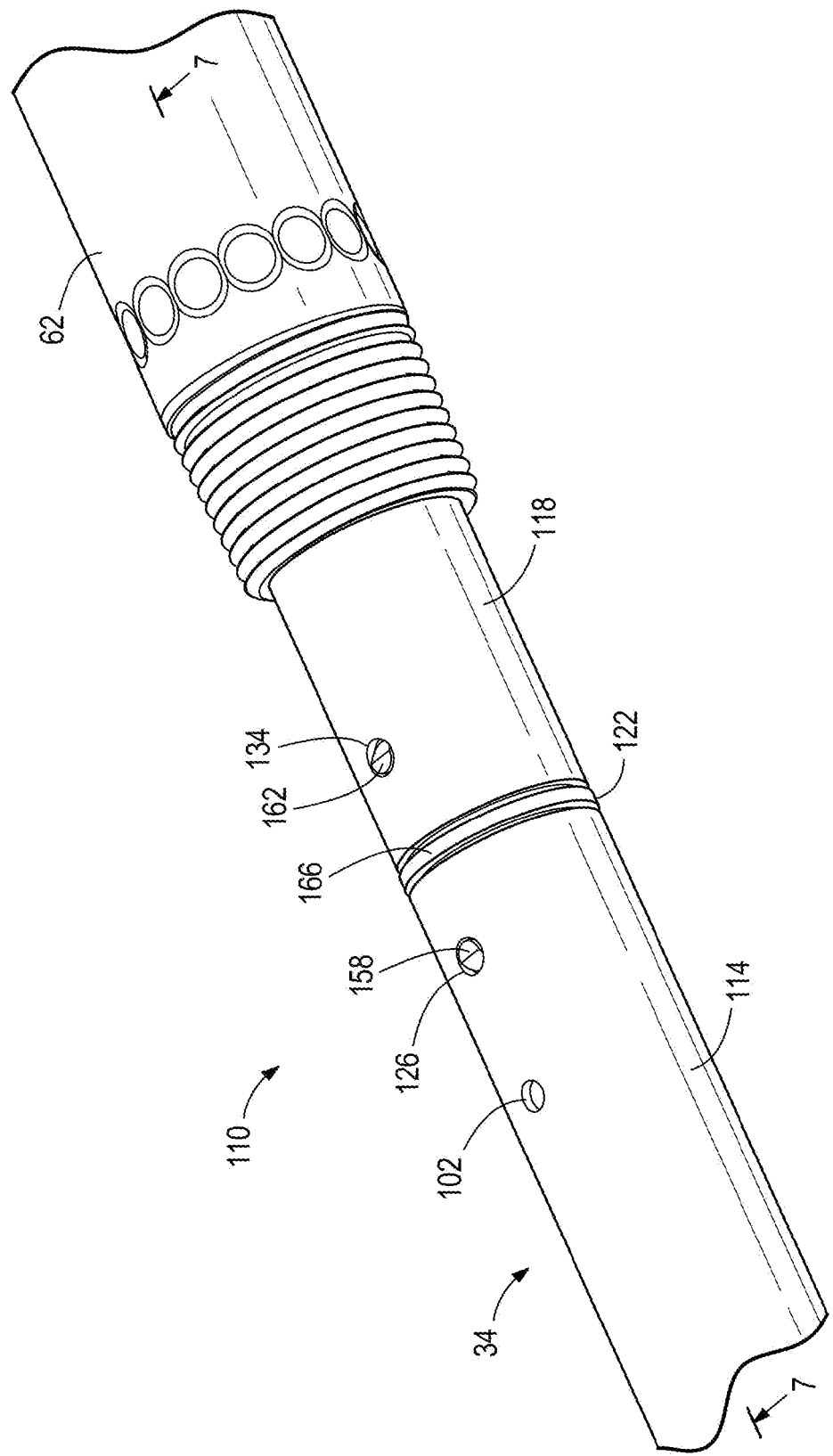
FIG. 4 is a perspective view of a portion of a dip tube assembly including a cold water egress prevention mechanism according to a first embodiment.
Figure 5:
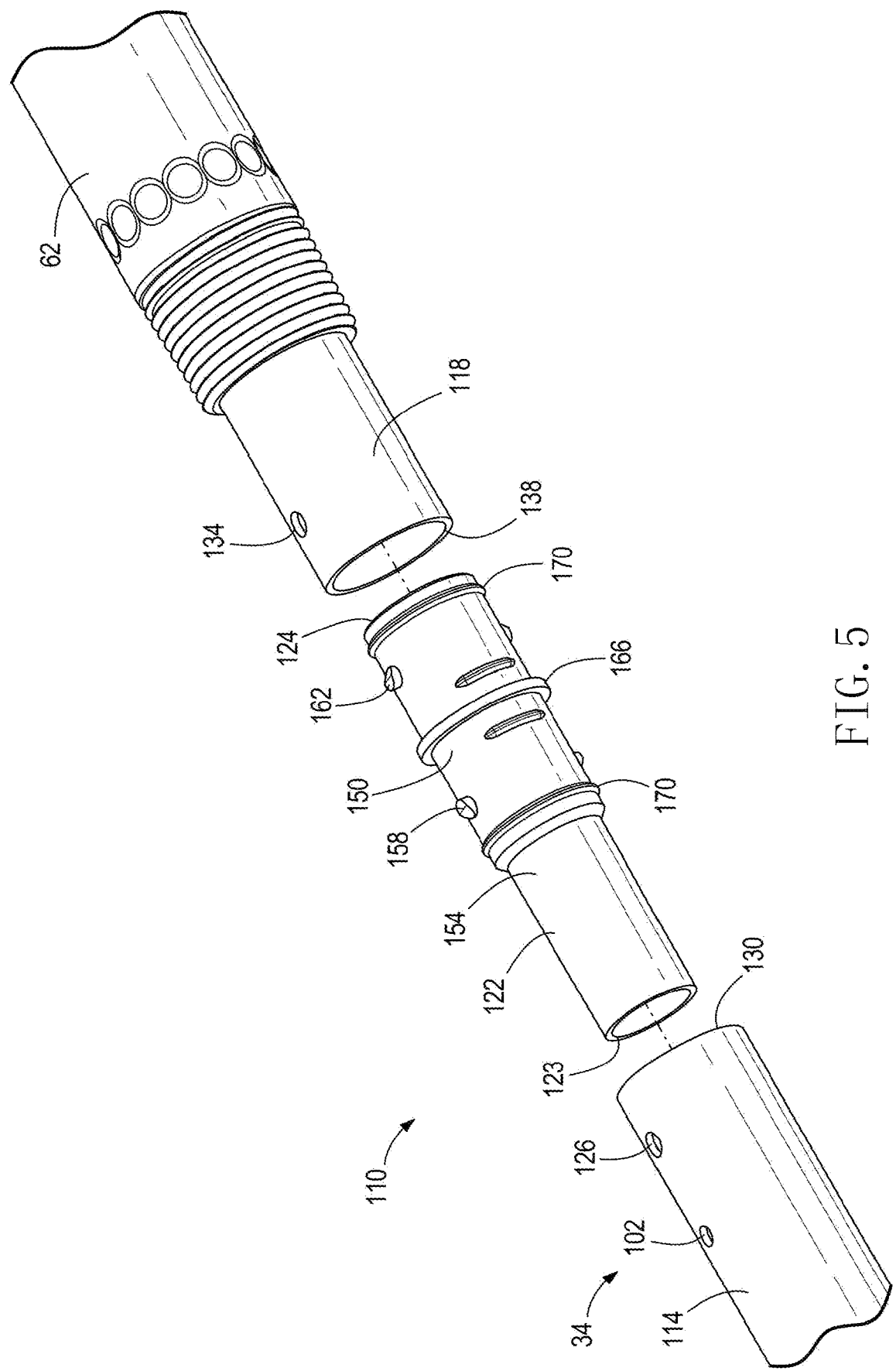
FIG. 5 is an exploded view of the portion of the dip tube assembly of FIG. 4.
Figure 6:
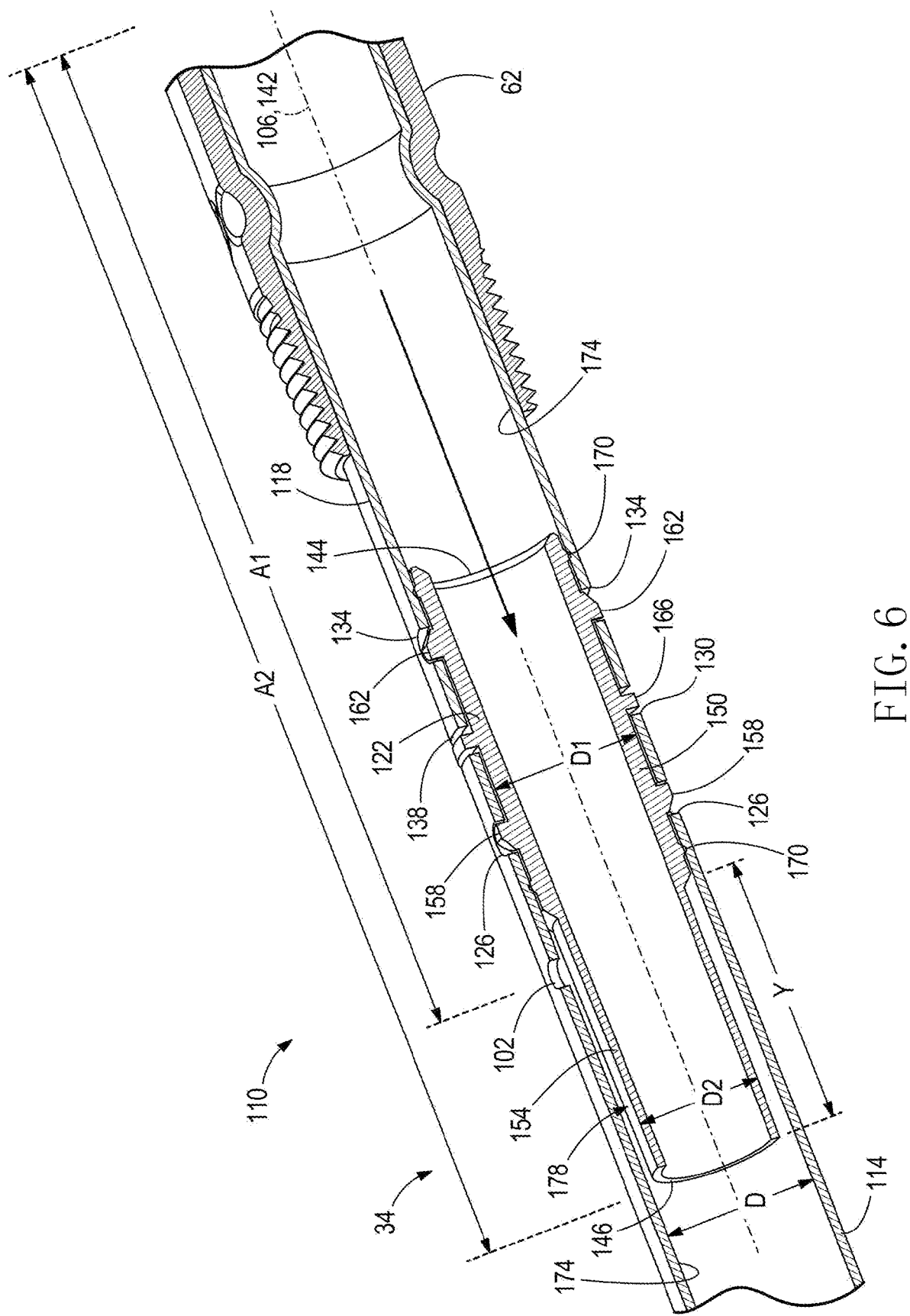
FIG. 6 is a cross-sectional view of the portion of the dip tube assembly of FIG. 4.

FIGS. 4-6 illustrate a first example embodiment of a cold water egress prevention mechanism 110 for the dip tube assembly 90. The illustrated dip tube 34 is divided into a first body portion 114 and a second body portion 118. In other embodiments, the first body portion 114 is the entire dip tube 34 and the second body portion is an extension of the connector 62. The cold water egress prevention mechanism 110 includes a third body portion 122 coupled between the first and second body portions 114, 118. More specifically, the third body portion 122 includes a first end 123 extending into the first body portion 114 and a second end 124 extending into the second body portion 118, and may therefore be alternatively referred to as an insert.

With reference to FIG. 5, the first body portion 114 includes a bottom end that defines the outlet end 82 of the dip tube 34 and a top end 130 (opposite the outlet end 82). The first body portion 114 also includes the anti-siphon orifice 102 and a pair of diametrically opposed first holes 126 (see FIG. 6) extending through a wall of the first body portion 114. The first holes 126 are positioned between the anti-siphon orifice 102 and the top end 130 of the first body portion 114.

With reference to FIGS. 5 and 6, the second body portion 118 includes a top end which defines the inlet end 78 of the dip tube 34 and a bottom end 138 opposite the inlet end 78. The second body portion 118 also includes a pair of diametrically opposed second holes 134 extending through a wall of the second body portion 118. The second holes 134 are positioned between an end of the connector 62 and the bottom end 138 of the first body portion 118. The top end of the second body portion 118 is inserted into the connector 62 and the bottom end 138 extends out of the connector 62.

With continued reference to FIGS. 5 and 6, the insert 122 includes a central axis 142 that is colinear with the longitudinal axis 106 of the dip tube assembly 90. The insert 122 includes a first section 150 having a diameter D1 (FIG. 6) and a second section 154 having a diameter D2 that is smaller than the diameter D1 of the first section 150. The diameters D1, D2 are less than an inner diameter D of the dip tube 34 so that the insert 122 can be telescopically received inside the first and second body portions 114, 118.

The first section 150 of the insert 122 includes first and second pairs of diametrically opposed projections 158, 162 extending radially outward (i.e., perpendicular to the central axis 142). The first and second pairs of projections 158, 162 are configured to be received in the first and second diametrically opposed holes 126, 134, respectively. The holes 126, 134 and the projections 158, 162 are provided for coupling the insert 122 to the first and second body portions 114, 118. In other embodiments, the pairs of diametrically opposed holes and projections 126, 134, 158, 162 may be switched so that the holes are on the insert 122 and the projections are on the dip tube 34. In other embodiments, the pairs of diametrically opposed holes and projections 126, 134, 158, 162 include mixed pairs of holes and projections. In other embodiments, the pairs of diametrically opposed holes and projections 126, 134, 158, 162 may be replaced by a single hole or projection. In other embodiments, the insert 122 may include more than a pair of holes/projections and the holes and projections may not be diametrically opposed. For example, the holes and projections may be arranged to dictate a specific clocking of the dip tube 34. In further other embodiments, the insert 122 may include similar or other coupling features (e.g., crimping, heat-staked, and the like) for coupling the first body portion 114, the second body portion 118, and the insert together 122.

With reference to FIGS. 4 and 5, the first section 150 of the insert 122 also includes an annular flange 166 extending radially outward therefrom relative to the central axis 142. The annular flange 166 is positioned axially between the first projections 158 and the second projections 162. Each end 130, 138 of the first body portion 114 and the second body portion 118, respectively, is configured to abut against or otherwise contact opposite sides of the annular flange 166 when the cold water egress prevention mechanism 110 and the dip tube 34 are assembled together. The annular flange 166 is configured to limit axial movement of the first body portion 114 and the second body portion 118 relative to the insert 122. More specifically, the annular flange 166 limits the axial position of the first body portion 114 and the second body portion 118 relative to the insert 122.

Referring again to FIGS. 5 and 6, the insert 122 further includes an engaging member 170 at each end of the first section 150 such that the projections 158, 162 are axially between the annular flange 166 and the respective engaging members 170. The engaging members 170 are configured to engage with an inner surface 174 of the dip tube 34. The engaging members 170 are configured as friction fit rings to create a seal between the first body portion 114, the second body portion 118, and the insert 122. As such, each of the engaging members 170 may be configured as a sealing member to inhibit or prevent fluid from flowing between the first section 150 of the insert 122 and the inner surfaces 174 of the first and second body portions 114, 118, respectively.

Referring to FIG. 6, when the cold water egress prevention mechanism 110 and the dip tube 34 are assembled together, the first section 150 of the insert 122 is received in the second body portion 118 up to the annular flange 166, and the remaining portion of the first section 150 and the second section 154 of the insert 122 are received in the first body portion 114 up to the annular flange 166. The first section 150 of the insert 122 is positioned axially above the anti-siphon orifice 102 and the second section 154 of the insert 122 extends axially beyond the anti-siphon orifice 102. The anti-siphon orifice 102 communicates with an annular space or flow channel 178 defined between the dip tube 34 and the second section 154 of the insert 122, as will be discussed below.

With continued reference to FIG. 6, the anti-siphon orifice 102 is located at a first distance A1 from the inlet end 78 of the dip tube 34. In addition, the insert 122 extends to a second distance A2 from the inlet end 78. The second distance A2 is greater than the first distance A1. As such, the second section 154 of the insert 122 is sized (and positioned) to extend axially beyond the position of the anti-siphon orifice 102 when the cold water egress prevention mechanism 110 and the dip tube 34 are assembled together.

The second section 154 of the insert 122 and the portion of the first body portion 114 facing the second section 154 define the flow channel 178 within the inner volume of the dip tube 34. As such, the flow channel 178 is formed between the first body portion 114 and the insert 122. The flow channel 178 is an annulus (i.e., has an annular shape). The flow channel 178 is positioned radially outward of the second section 154 relative to the central axis 142 of the insert 122. An axial length of the flow channel 178 equals an axial length Y of the second section 154. In some embodiments, the axial length Y of the second section 154 is less than or equal to 5 inches. For example, in the illustrated embodiment, the axial length Y of the second section 154 is between 1 inch and 1.5 inches. The diameter D2 of the second section 154 is sized to be less than the inner diameter D of the first body portion 114 in order to form the flow channel 178.

The flow channel 178 forms part of the inner volume of the dip tube 34. In addition, the flow channel 178 connects the anti-siphon orifice 102 to a remainder of the inner volume of the dip tube 34. The flow channel 178 is in fluid communication with the anti-siphon orifice 102. The flow channel 178 is not along the fluid flow path through the dip tube 34 from the inlet end 78 to the outlet end 82. The fluid flow path is configured to prevent flow through the anti-siphon orifice 102 when fluid is flowing along the fluid flow path from the inlet end 78 to the outlet end 82 and to allow flow through the anti-siphon orifice 102 in the absence of fluid flow along the fluid flow path from the inlet end 78 to the outlet end 82. For example, air may flow through the anti-siphon orifice 102 when fluid flow is through the dip tube 34 in a direction that is toward the inlet end 78 (e.g., during a siphoning event). Once air has displaced all of the water within the flow channel 178, the siphoning of water from the tank 14 will be halted.

Figure 7A:
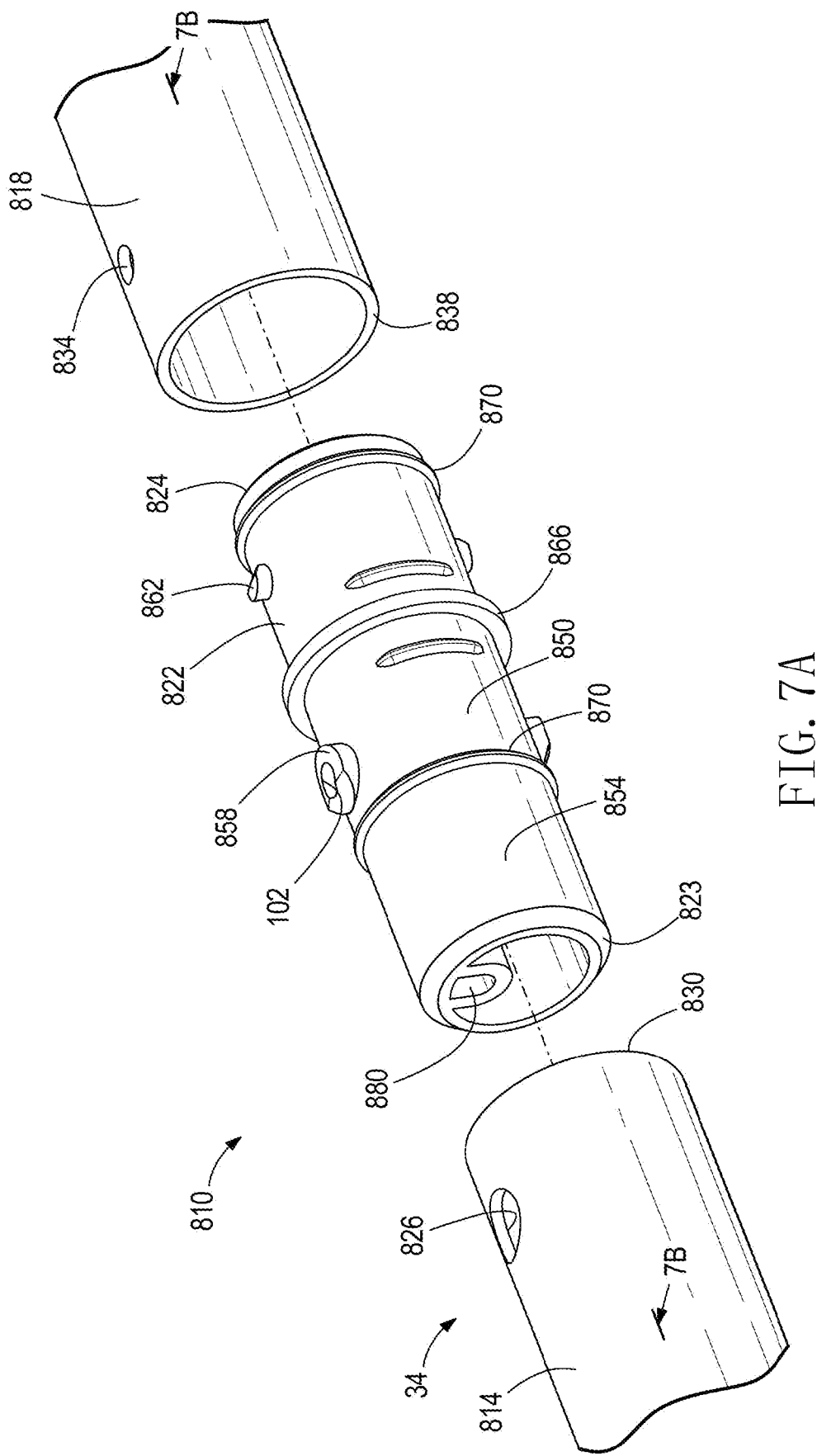
FIG. 7A is an exploded view of a portion of a dip tube assembly including a cold water egress prevention mechanism according to a second embodiment.
Figure 7B:
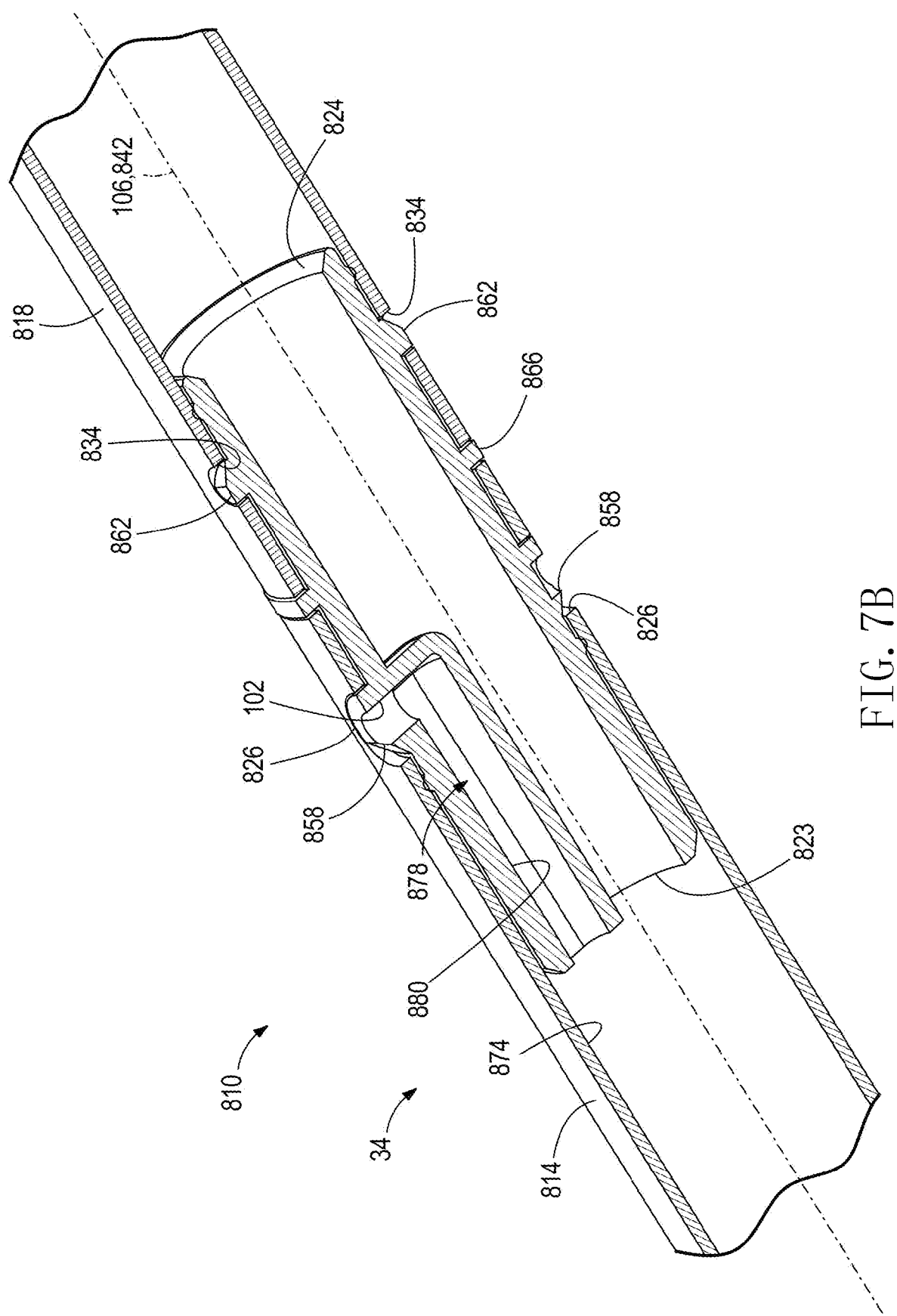
FIG. 7B is a cross-sectional view of the portion of the dip tube assembly of FIG. 7A.

FIGS. 7A-7B illustrate another exemplary embodiment of a cold water egress prevention mechanism 810 for the dip tube assembly 90, with like components and features as the embodiment of the cold water egress prevention mechanism 110 shown in FIGS. 4-6 being labeled with like reference numerals plus "700." The cold water egress prevention mechanism 810 is similar to the cold water egress prevention mechanism 110 and, accordingly, the discussion of the cold water egress prevention mechanism 110 above similarly applies to the cold water egress prevention mechanism 810 and is not restated. In particular, instead of the flow channel 178 defined between an outer surface of the insert 122 and a portion of the dip tube 34, the flow channel 878 is defined by an interior of the insert 822.

The insert 822 includes a central axis 842 extending therethrough. The insert 822 extends between a first end 823 and a second end 824 opposite the first end 823. The insert 822 includes a first section 850 and a second section 854 extending axially therefrom relative to the central axis 842. The insert 822 also includes the first and second engaging members 870 extending radially outward from the first section 850 relative to the central axis 842. The first and second engaging members 870 are configured to engage with an inner surface 874 of the dip tube 34. The first and second engaging members 870 are configured as friction fit rings for sealingly coupling the dip tube 34 and the insert 822 together. More specifically, the first and second engaging members 870 are press fit to the inner diameter of the dip tube 34.

The first section 850 of the insert 822 includes first and second pairs of diametrically opposed projections 858, 862 extending radially outward (i.e., perpendicular to the central axis 842). The first and second pairs of projections 858, 862 are configured to be received in the first and second diametrically opposed holes 826, 834, respectively. The holes 826, 834 and the projections 858, 862 are provided for coupling the insert 822 to the first and second body portions 814, 818.

Unlike the first embodiment of the cold water egress prevention mechanism 110, the insert 822 include the anti-siphon orifice 102 (rather than the first body portion 814). More specifically, with reference to FIG. 7B, one of the diametrically opposed projections 858 of the first section 850 of the insert 122 includes the anti-siphon orifice 102. The anti-siphon orifice 102 extends through the projection 858. The projection 858 and the corresponding hole 826 of the first body portion 814 may be sized to form the anti-siphon orifice 102. The insert 822 further includes a tunnel 880 in fluid communication with the anti-siphon orifice 102. The tunnel 880 is positioned radially inward of the second section 854 of the insert 822 relative to the central axis 842.

The tunnel 880 defines the flow channel 878 within the inner volume of the dip tube 34. As such, the flow channel 878 is formed by a portion of the insert 822. The flow channel 878 forms part of the inner volume of the dip tube 34. In addition, the flow channel 878 connects the anti-siphon orifice 102 to a remainder of the inner volume of the dip tube 34. The flow channel 878 is not along the fluid flow path through the dip tube 34 from the inlet end 78 to the outlet end 82. The fluid flow path is configured to prevent flow through the anti-siphon orifice 102 when fluid is flowing along the fluid flow path from the inlet end 78 to the outlet end 82 (e.g., during a hot water draw) and to allow flow through the anti-siphon orifice 102 in the absence of fluid flow along the fluid flow path from the inlet end 78 to the outlet end 82 (e.g., during a siphoning event).

Figure 8:
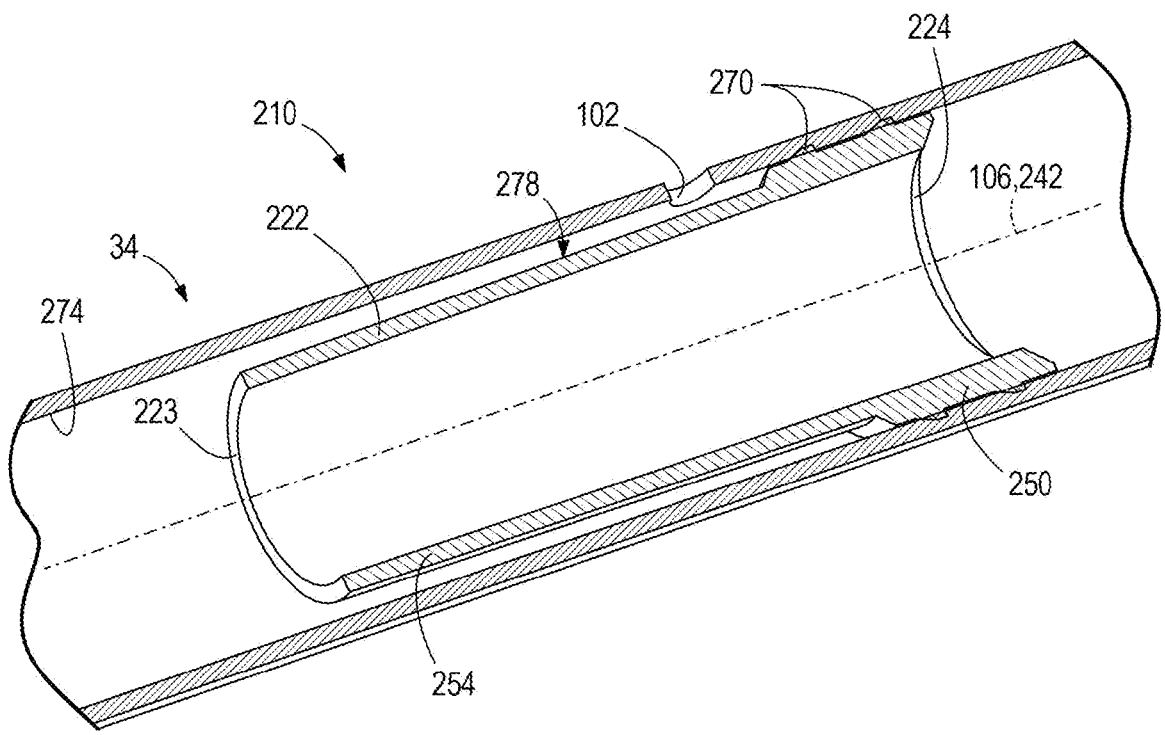
FIG. 8 is a cross-sectional view of a portion of a dip tube assembly including a cold water egress prevention mechanism according to a third embodiment.
Figure 9:
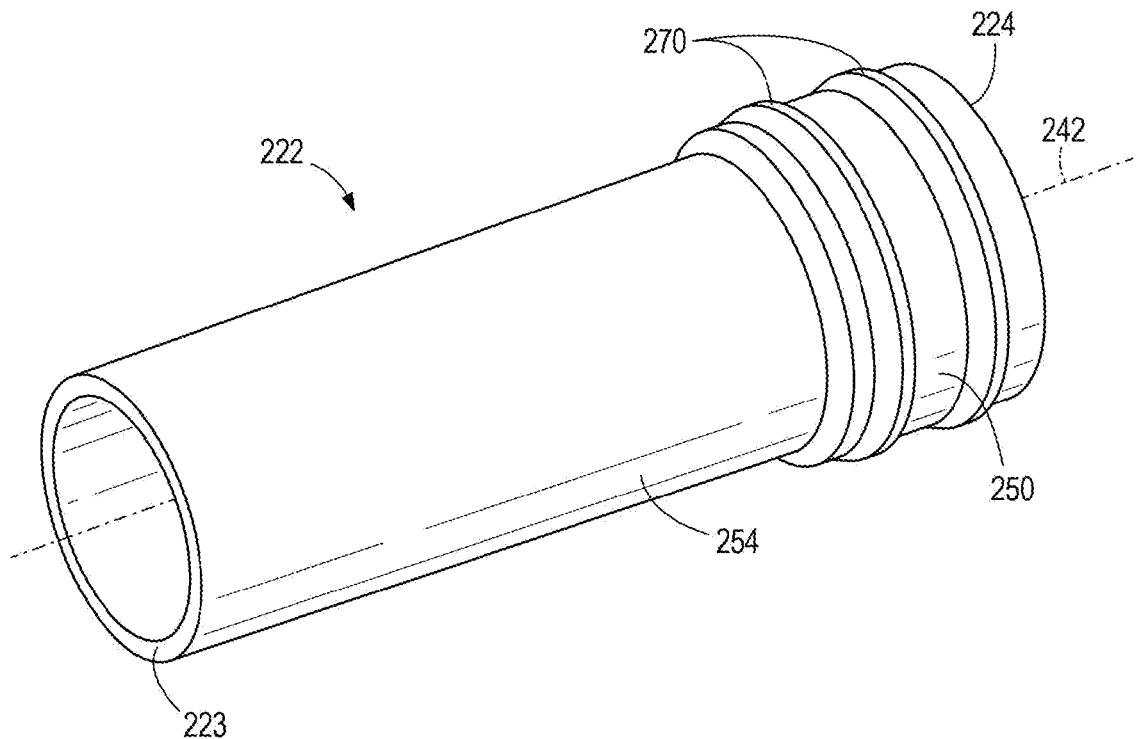
FIG. 9 is a perspective view of an insert of the cold water egress prevention mechanism of FIG. 8.

FIGS. 8-9 illustrate yet another exemplary embodiment of a cold water egress prevention mechanism 210 for the dip tube assembly 90, with like components and features as the embodiment of the cold water egress prevention mechanism 110 shown in FIGS. 4-6 being labeled with like reference numerals plus "100." The cold water egress prevention mechanism 210 is similar to the cold water egress prevention mechanisms 110, 810 and, accordingly, the discussion of the cold water egress prevention mechanisms 110, 810 above similarly applies to the cold water egress prevention mechanism 210 and is not restated. In particular, instead of a two-piece dip tube and the third body portion/insert 122 being used to couple the two pieces of the dip tube 34 together, the insert 222 of the cold water egress prevention mechanism 210 is received within or inserted into the inner volume of the dip tube 34. As such, in the present embodiment, the dip tube 34 may be referred to as a 'first body portion' and the insert 222 may be referred to as a 'second body portion.'

The insert 222 includes a central axis 242 extending therethrough. The insert 222 extends between a first end 223 and a second end 224 opposite the first end 223. The insert 222 includes a first section 250 and a second section 254 extending axially therefrom relative to the central axis 242. The insert 222 also includes the first and second engaging members 270 extending radially outward from the first section 250 relative to the central axis 242. The first and second engaging members 270 are configured to engage with an inner surface 274 of the dip tube 34. The first and second engaging members 270 are configured as friction fit rings for sealingly coupling the dip tube 34 and the insert 222 together. More specifically, the first and second engaging members 270 are press fit to the inner diameter of the dip tube 34.

When the cold water egress prevention mechanism 210 and the dip tube 34 are assembled together, the insert 222 is received in the dip tube 34 and positioned proximate the anti-siphon orifice 102. In particular, the insert 222 is positioned such that the first section 250 of the insert 222 is positioned axially above the anti-siphon orifice 102 and the second section 254 of the insert 222 extends axially beyond the anti-siphon orifice 102 relative to the longitudinal axis 106 of the dip tube assembly 90.

The second section 254 and the portion of the dip tube 34 facing the second section 254 define the annulus flow channel 278 within the inner volume of the dip tube 34. As such, the flow channel 278 is formed between the portion of the dip tube 34 and the insert 222. The flow channel 278 forms part of the inner volume of the dip tube 34. In addition, the flow channel 278 connects the anti-siphon orifice 102 to a remainder of the inner volume of the dip tube 34. The flow channel 278 is not along the fluid flow path through the dip tube 34 from the inlet end 78 to the outlet end 82. The fluid flow path is configured to prevent flow through the anti-siphon orifice 102 when fluid is flowing along the fluid flow path from the inlet end 78 to the outlet end 82 (e.g., during a hot water draw) and to allow flow through the anti-siphon orifice 102 in the absence of fluid flow along the fluid flow path from the inlet end 78 to the outlet end 82 (e.g., during a siphoning event).

FIG. 10 illustrates yet still another exemplary embodiment of the cold water egress prevention mechanism 310 for the dip tube assembly 90. The cold water egress prevention mechanism 310 is similar to the cold water egress prevention mechanisms 110, 210, 810 in that the cold water egress prevention mechanism 310 is configured to inhibit or prevent cold water from flowing through the anti-siphon orifice 102 during a hot water draw (i.e., when fluid is flowing from the inlet end 78 toward the outlet end 82).

The cold water egress prevention mechanism 310 includes a locking member 314 and an elastomeric membrane 318 securably coupled to the dip tube 34 by the locking member 314. The locking member 314 includes a base 322 and first and second end portions 326, 330, respectively, positioned at opposite ends of the base 322. The first end portion 326 is received in a hole 334 defined by a wall of the dip tube 34. The base 322 extends from the first end portion 326 through the hole 334 to the second end portion 330. The second end portion 330 is positioned within the inner volume of the dip tube 34. The hole 334 is positioned axially above the anti-siphon orifice 102. The illustrated hole 334 has an oblong shape. The hole 334 may be shaped to inhibit or prevent the cold water egress prevention mechanism 310 from moving or rotating within the hole 334.

The locking member 314 is configured as a clamp. In the illustrated embodiment of FIG. 10, the locking member 314 is an injection molded plastic clamp (i.e., molded plastic part). The locking member 314 may be secured to the elongated body 74 of the dip tube 34 by deforming a portion of one or both of the clamp and the elongated body 74 of the dip tube 34. For example, the locking member 314 may be secured to the hole 334 of the dip tube 34 by heat staking or ultrasonic staking. In another example of the cold water egress prevention mechanism 310, as shown in FIG. 11, the locking member 314 is a formed metal part for securing the elastomeric membrane 318 to the dip tube 34. For example, the locking member 314 may be a rivet. In still other embodiments, the locking member 314 can be a molded elastomeric part, such that the end portion 326 can be temporarily deformed in order to be passed through the hole 334 to secure the locking member 314 to the dip tube 34. The elastomeric membrane 318 can be integrally formed with such an elastomeric locking member 314, or can remain a separate part.

With reference to FIGS. 10 and 12, the elastomeric membrane 318 of the cold water egress prevention mechanism 310 includes a body 342 having a first section 346 and a second section 350. The first section 346 is coupled to the locking member 314. In the illustrated embodiment, the first section 346 includes an aperture 354 (FIG. 12) and the base 322 of the locking member 314 extends through the aperture 354. The first section 346 is positioned (e.g., sandwiched) between the first and second end portions 326, 330, respectively, of the locking member 314. The second section 350 extends from the first section 346 to selectively cover the anti-siphon orifice 102, as further discussed below.

The elastomeric membrane 318 is arranged within the internal volume of the dip tube 34. The elastomeric membrane 318 is formed by an elastomeric material (e.g., rubber). The second section 350 of the elastomeric membrane 318 is movable (e.g., pivotable or bendable) between a first position (FIG. 10) in which the second section 350 is positioned over or otherwise covers the anti-siphon orifice 102, and a second position (shown in dotted lines in FIG. 11)

in which the second section 350 is moved away from the anti-siphon orifice 102. More specifically, the second section 350 is movable radially away from an inner wall 358 of the dip tube 34 toward a center of the dip tube 34. Accordingly, the cold water egress prevention mechanism 310 may be referred to as a 'check valve.'

When the cold water egress prevention mechanism 310 is assembled, the locking member 314 is positioned axially above the anti-siphon orifice 102 relative to the fluid flow path from the inlet end 78 to the outlet end 82 of the dip tube 34. In addition, the elastomeric membrane 318 is arranged in the vicinity of the anti-siphon orifice 102. More specifically, the elastomeric membrane 318 extends from the locking member 314 axially downward past the anti-siphon orifice 102 relative to the longitudinal axis 106 of the dip tube assembly 90.

During operation, when the second section 350 of the elastomeric membrane 318 is in the first position, the elastomeric membrane 318 is operable to block fluid flow through the anti-siphon orifice 102. When the second section 350 of the elastomeric membrane 318 is in the second position, the elastomeric membrane 318 is operable to allow fluid flow through the anti-siphon orifice 102.

The elastomeric membrane 318 is movable based on a pressure at the inlet end 78 of the dip tube 34 relative to an exterior of the dip tube 34 adjacent to the anti-siphon orifice 102. In particular, the elastomeric membrane 318 is operable to block fluid flow through the anti-siphon orifice 102 when a pressure at the inlet end 78 is greater than a pressure at the exterior of the dip tube 34 adjacent to the anti-siphon orifice 102 (e.g., during a hot water draw), and to allow fluid flow through the anti-siphon orifice 102 when a pressure at the inlet end 78 is less than a pressure at the exterior of the dip tube 34 adjacent to the anti-siphon orifice 102 (e.g., during a siphoning event). In the illustrated embodiment, the second section 350 of the elastomeric membrane 318 is in the first position when the pressure at the inlet end 78 is greater than the pressure at the exterior of the dip tube 34 adjacent to the anti-siphon orifice 102. The second section 350 of the elastomeric membrane 318 is movable from the first position toward the second position when the pressure at the inlet end 78 is less than the pressure at the exterior of the dip tube 34 adjacent to the anti-siphon orifice 102.

The orientation of the egress elastomeric membrane 318 facilitates the desired movement of the second section 350 of the elastomeric membrane 318. More specifically, the egress elastomeric membrane 318 is attached to the dip tube 34 at a point that is upstream of the anti-siphon orifice 102 from the perspective of cold water flowing through the dip tube 34 along the fluid flow path during a hot water draw. As such, the egress elastomeric membrane 318 lays in a downstream direction against the anti-siphon orifice 102 during a hot water draw and the inflow of cold water tends to keep it lying in this direction and against the anti-siphon orifice 102. Since the second section 350 is larger than the size of the orifice 102, flow through the orifice 102 is blocked by the elastomeric membrane 18 being pressed against the wall 358. On the other hand, during a siphon event, the egress elastomeric membrane 318 lays in an upstream direction from the perspective of air flowing into the dip tube 34 through the anti-siphon orifice 102. The flow of air will therefore cause the elastomeric membrane 318 to pivot away from the wall 358 in the area of the anti-siphon orifice 102, thus halting the siphoning of water.

Figure 13:
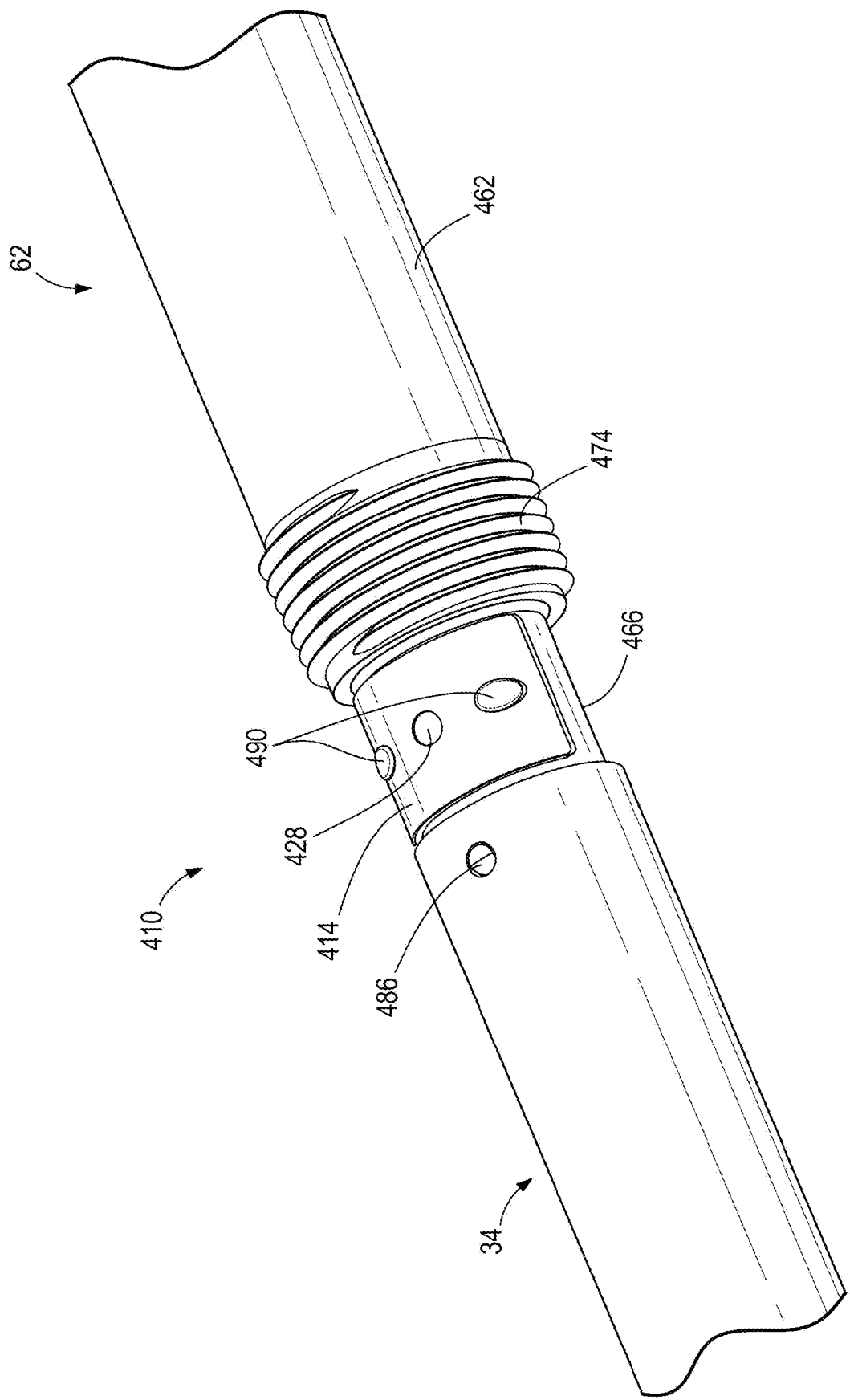
FIG. 13 is a perspective view of a portion of a dip tube assembly including a cold water egress prevention mechanism according to a fifth embodiment.
Figure 14:
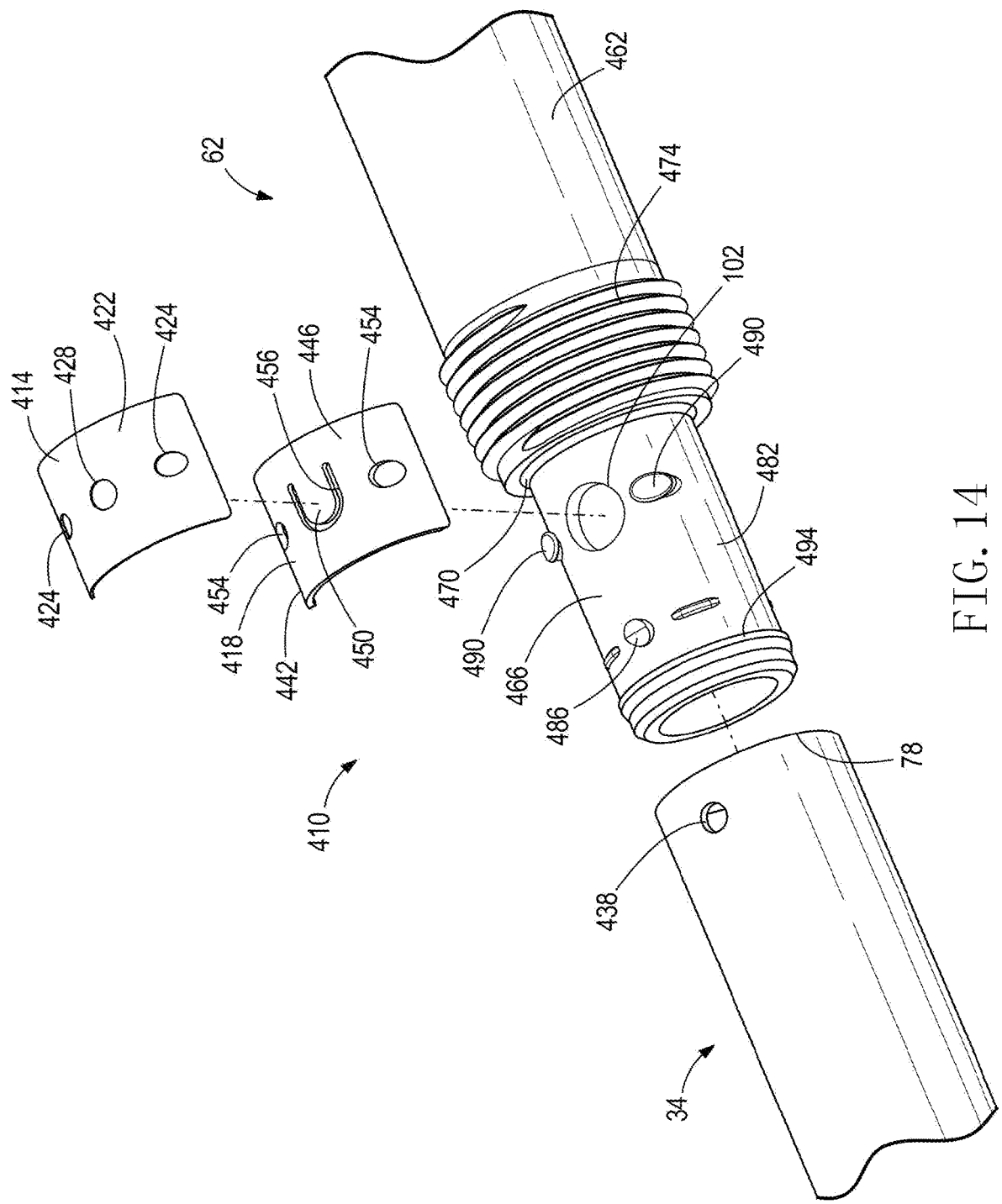
FIG. 14 is an exploded view of the portion of the dip tube assembly of FIG. 13.
Figure 15:
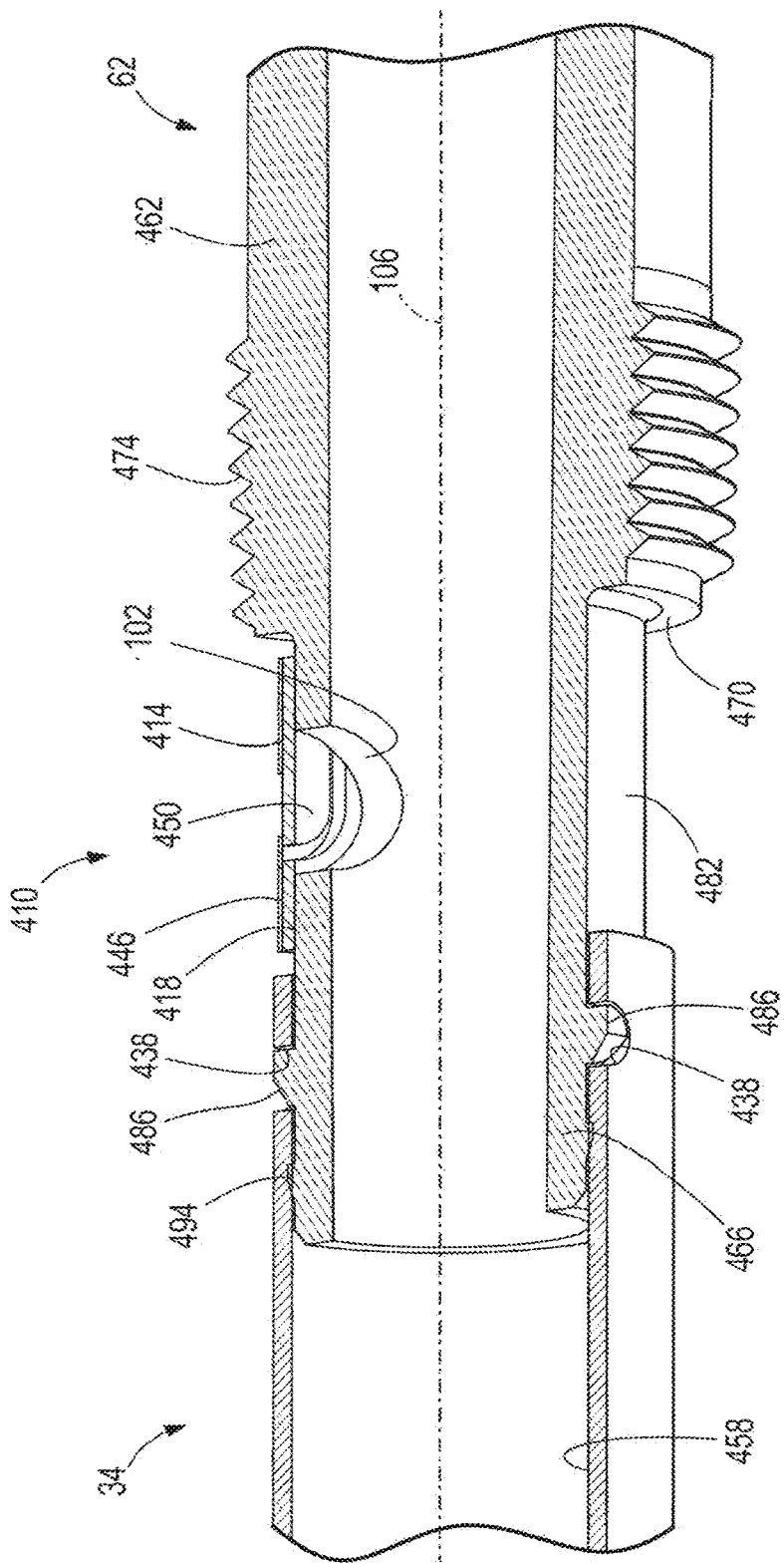
FIG. 15 is a cross-sectional view of the portion of the dip tube assembly of FIG. 13.

FIGS. 13-15 illustrate another exemplary embodiment of a cold water egress prevention mechanism 410 for the dip tube assembly 90, with like components and features as the embodiment of the cold water egress prevention mechanism 310 shown in FIGS. 10-12 being labeled with like reference numerals plus "100." The cold water egress prevention mechanism 410 is similar to the cold water egress prevention mechanism 310 and, accordingly, the discussion of the cold water egress prevention mechanism 310 above similarly applies to the cold water egress prevention mechanism 410 and is not restated. Rather, only differences between the cold water egress prevention mechanism 310 and the cold water egress prevention mechanism 410 are specifically noted herein, such as differences in the configuration of the dip tube assembly 90 and the coupling of the elastomeric membrane to the dip tube assembly 90.

As illustrated in FIG. 15, the dip tube 34 includes a pair of diametrically opposed holes 438 proximate the inlet end 78 of the dip tube 34. The connector 62 of the dip tube assembly 90 includes a first section 462 and a second section 466. The first section 462 has an annular end wall 470. In addition, the illustrated first section 462 has outer threads 474 positioned adjacent the annular end wall 470 for connecting to the inlet spud 30 of the water heater 10. The second section 466 axially extends from the end wall 470 and has an outer diameter just smaller than the inner diameter of the dip tube 34 so that the second section 466 fits snugly within the dip tube 34.

In addition, the second section 466 of the connector 62 has the anti-siphon orifice 102 extending through a wall of the second section 466. The anti-siphon orifice 102 is positioned proximate the end wall 470. A size of the anti-siphon orifice 102 is greater than a size of the anti-siphon orifice 102 described and illustrated in the embodiments above. As such, the anti-siphon orifice 102 may be referred to as an 'oversized' anti-siphon orifice 102. In addition, the second section 466 is referred to herein as an extension 466 of the connector 62.

With reference to FIGS. 14 and 15, the extension 466 has a plurality of projections 486, 490 extending radially outward from the outer surface 482 relative to the longitudinal axis 106 of the dip tube assembly 90. A first projection 486 is receivable in each hole 438 of the dip tube 34 (FIG. 15). The illustrated extension 466 has two first diametrically opposed projections 486. In other embodiments, the extension 466 of the connector 62 may include the holes rather than the projections, or a combination of projections and holes, and the dip tube 34 includes the other of the holes/projections. The holes 438 and the projections 486 are provided for coupling the dip tube 34 to the extension 466 of the connector 62. In other embodiments, the extension 466 may include one or more holes/projections. In further other embodiments, the extension 466 may include similar or other coupling features (e.g., crimping, heat-staked, and the like) for coupling the dip tube 34 and the extension 466 together.

The extension 466 also includes an engaging member 494 extending radially outward from the outer surface 482 relative to the longitudinal axis 106 of the dip tube assembly 90. The engaging member 494 is axially positioned between the first diametrically opposed projections 486 and the free distal end of the extension 466. The engaging member 494 is configured to engage with an inner surface 458 (FIG. 15) of the dip tube 34. The engaging member 494 is configured as a friction fit ring to sealingly couple the dip tube 34 and the extension together 466. The illustrated connector 62 is an injection molded plastic pipe nipple. In other embodiments, rather than being integrated within the connector 62, the extension 466 extends from the elongated body 74 of the dip tube 34 and is received in the connector 62.

The cold water egress prevention mechanism 410 includes a locking member 414 and an elastomeric membrane 418 (FIG. 14) securably coupled to the extension 466 by the locking member 414. More specifically, the locking member 414 is configured to couple the elastomeric membrane 418 to the outer surface 482 of the extension 466. The locking member 414 includes a base 422, and a plurality of holes 424, 428 extending through the base 422. The illustrated locking member 414 includes three holes 424, 428 but may alternatively include two or more holes 424, 428. A second projection 490 of the plurality of projections 486, 490 of the extension 466 is receivable in at least one hole 424 of the locking member 414 for coupling the extension 466 and the locking member 414 together. In the illustrated embodiment, as shown in FIG. 13, the cold water egress prevention mechanism 410 includes two second projections 490 each of which is received in one of the two of the holes 424 of the locking member 414.

The remaining hole 428 of the locking member 414 is sized to be less than a size of the anti-siphon orifice 102. The hole 428 has a round shape. The hole 428 of the locking member 414 may have a diameter of 0.5 inches or less. In the illustrated embodiment, the hole 428 of the locking member 414 has a diameter of ⅛ inch. In other embodiments, the hole 428 has a diameter of at least one eighth of an inch. The hole 428 of the locking member 414 is configured to align with the anti-siphon orifice 102, as further discussed below.

The locking member 414 is configured as a clamp. In the illustrated embodiment, the locking member 414 is a stainless-steel clamp (i.e., formed metal part). The locking member 414 may be secured to the extension 466 by deforming a portion of one or both of the clamp and the extension 466. For example, the locking member 466 may be secured to the projections 490 of the extension 466 by heat staking or ultrasonic staking. In other embodiments, the locking member 414 is a molded plastic part for securing the elastomeric membrane 418 to the extension 466.

With reference to FIGS. 14 and 15, the elastomeric membrane 418 of the cold water egress prevention mechanism 410 includes a body 442 having a first section 446 and a second section 450. The first section 446 is coupled to the locking member 414. In the illustrated embodiment, the first section 446 includes two apertures 454 aligned with the respective two of the holes 424 of the locking member 414. The second projections 490 of the extension 466 extend through the respective apertures 454 of the elastomeric membrane 418. As such, the holes 424 and apertures 454 and the projections 490 of the cold water egress prevention mechanism 410 are configured to locate the elastomeric membrane 418 and the locking member 414 relative to the extension 466. The first section 446 of the elastomeric membrane 418 is positioned (e.g., sandwiched) between the outer surface 482 of the extension 466 and the locking member 414.

The first section 446 further includes a cutout 456. The second section 450 of the elastomeric membrane 418 is movably positioned within the cutout 456. The second section 450 is sized to be at least partially received in the anti-siphon orifice 102. In addition, the second section 450 is sized to be greater than a size of the hole 428 of the locking member 414. The second section 450 of the elastomeric membrane 418 is configured to selectively seal against fluid flow through the anti-siphon orifice 102, as further discussed below.

The elastomeric membrane 418 is positioned exterior to the dip tube 34. The elastomeric membrane 418 is formed by an elastomeric material (e.g., rubber). The second section 450 of the elastomeric membrane 418 is movable (e.g., pivotable or bendable) between a first position (FIG. 15) in which the second section 450 is pressed against an inner side of the locking member 414 such that the second section 450 is positioned over or otherwise covers the hole 428 of the locking member 414, and a second position in which the second section 450 is received in the oversized anti-siphon orifice 102. More specifically, the second section 450 is sealed against the locking member 414 when in the first position, and the second section 450 is moved radially away from the locking member 414 toward the longitudinal axis 106 of the dip tube assembly 90 to uncover the hole 428 when the second section 450 is adjusted from the first position toward the second position.

When the cold water egress prevention mechanism 410 is assembled, the locking member 414 is positioned radially outward of the anti-siphon orifice 102 relative to the longitudinal axis 106. In addition, the elastomeric membrane 418 is arranged in the vicinity of the anti-siphon orifice 102. More specifically, the anti-siphon orifice 102 of the extension 466, the cutout 456 and second section 450 of the elastomeric membrane 418, and the hole 428 of the locking member 414 are radially aligned relative to the longitudinal axis 106. Accordingly, the anti-siphon orifice 102 of the extension 466, the cutout 456 of the elastomeric membrane 418, and the hole 428 of the locking member 414 may collectively form the anti-siphon orifice of the cold water egress prevention mechanism 410 in which each of the anti-siphon orifice 102 of the extension 466, the cutout 456 of the elastomeric membrane 418, and the hole 428 of the locking member 414 is a portion of the anti-siphon orifice. As such, the anti-siphon orifice of the cold water egress prevention mechanism 410 may be formed by a plurality of portions of the dip tube assembly 90.

The cutout 456 of the elastomeric membrane 418 is positioned radially between the anti-siphon orifice 102 of the extension 466 and the hole 428 of the locking member 414. Each of the anti-siphon orifice 102 of the extension 466, the cutout 456 of the elastomeric membrane 418, and the hole 428 of the locking member 414 define a portion of the secondary fluid flow path connecting the inner volume of the dip tube 34 to the exterior of the dip tube 34.

In addition, the extension 466 is received in the inner volume of the elongated body 74 of the dip tube 34 when the cold water egress prevention mechanism 410 and the dip tube 34 are assembled together. As such, in the illustrated embodiment, the extension 466 of the connector 62 defines a portion of the inner volume of the dip tube assembly 90.

During operation, when the second section 450 of the elastomeric membrane 418 is in the first position, the elastomeric membrane 418 is operable to block fluid flow through the anti-siphon orifice 102. When the second section 450 of the elastomeric membrane 418 is in the second position, the elastomeric membrane 418 is operable to allow fluid flow through the anti-siphon orifice 102.

The elastomeric membrane 418 is movable based on a pressure at the inlet end 78 of the dip tube 34 relative to an exterior of the dip tube 34 adjacent to the anti-siphon orifice 102. In particular, the elastomeric membrane 418 is operable to block fluid flow through the anti-siphon orifice 102 when a pressure at the inlet end 78 is greater than a pressure at the exterior of the dip tube 34 adjacent to the anti-siphon orifice 102, and to allow fluid flow through the anti-siphon orifice 102 when a pressure at the inlet end 78 is less than a pressure at the exterior of the dip tube 34 adjacent to the anti-siphon orifice 102. Accordingly, in the illustrated embodiment, the second section 450 of the elastomeric membrane 418 is in the first position when the pressure at the inlet end 78 is greater than the pressure at the exterior of the dip tube 34 adjacent to the anti-siphon orifice 102 (e.g., during a hot water draw). The second section 450 of the elastomeric membrane 418 is movable from the first position toward the second position when the pressure at the inlet end 78 is less than the pressure at the exterior of the dip tube 34 adjacent to the anti-siphon orifice 102 (e.g., during a siphoning event).

The orientation of the second section 450 facilitates the desired movement of the second section 450 of the elastomeric membrane 418. More specifically, the second section 450 lays in a downstream direction against the hole 428 during a hot water draw and the inflow of cold water tends to keep it lying in this direction and against the anti-siphon orifice 102. On the other hand, during a siphon event, the second section 450 lays in an upstream direction from the perspective of air flowing into the dip tube 34 through the anti-siphon orifice 102. The flow of air will therefore cause the elastomeric membrane 418 to pivot into the orifice 102, thus halting the siphoning of water.

Figure 16:
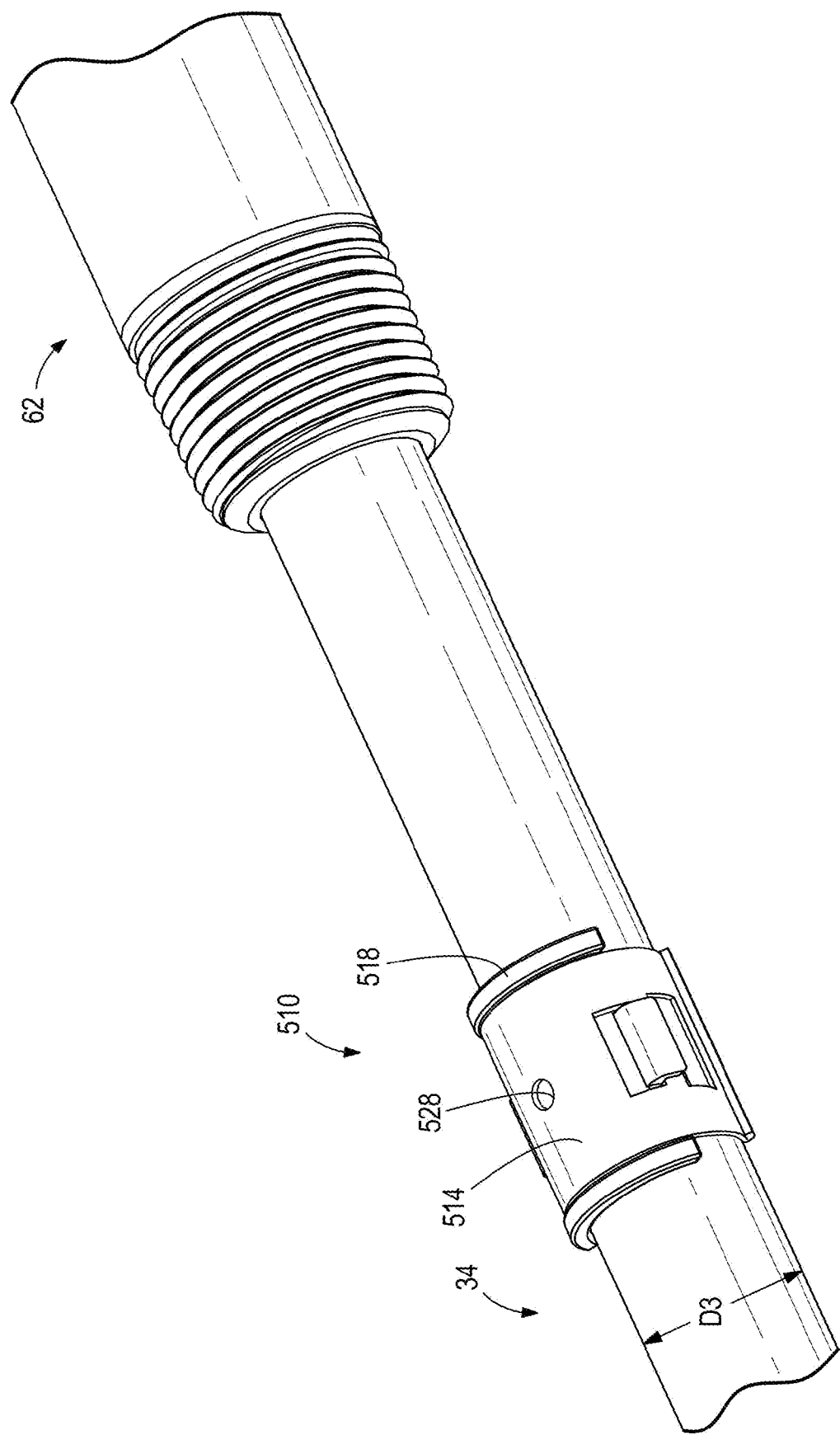
FIG. 16 is a perspective view of a portion of a dip tube assembly including a cold water egress prevention mechanism according to a sixth embodiment.
Figure 17:
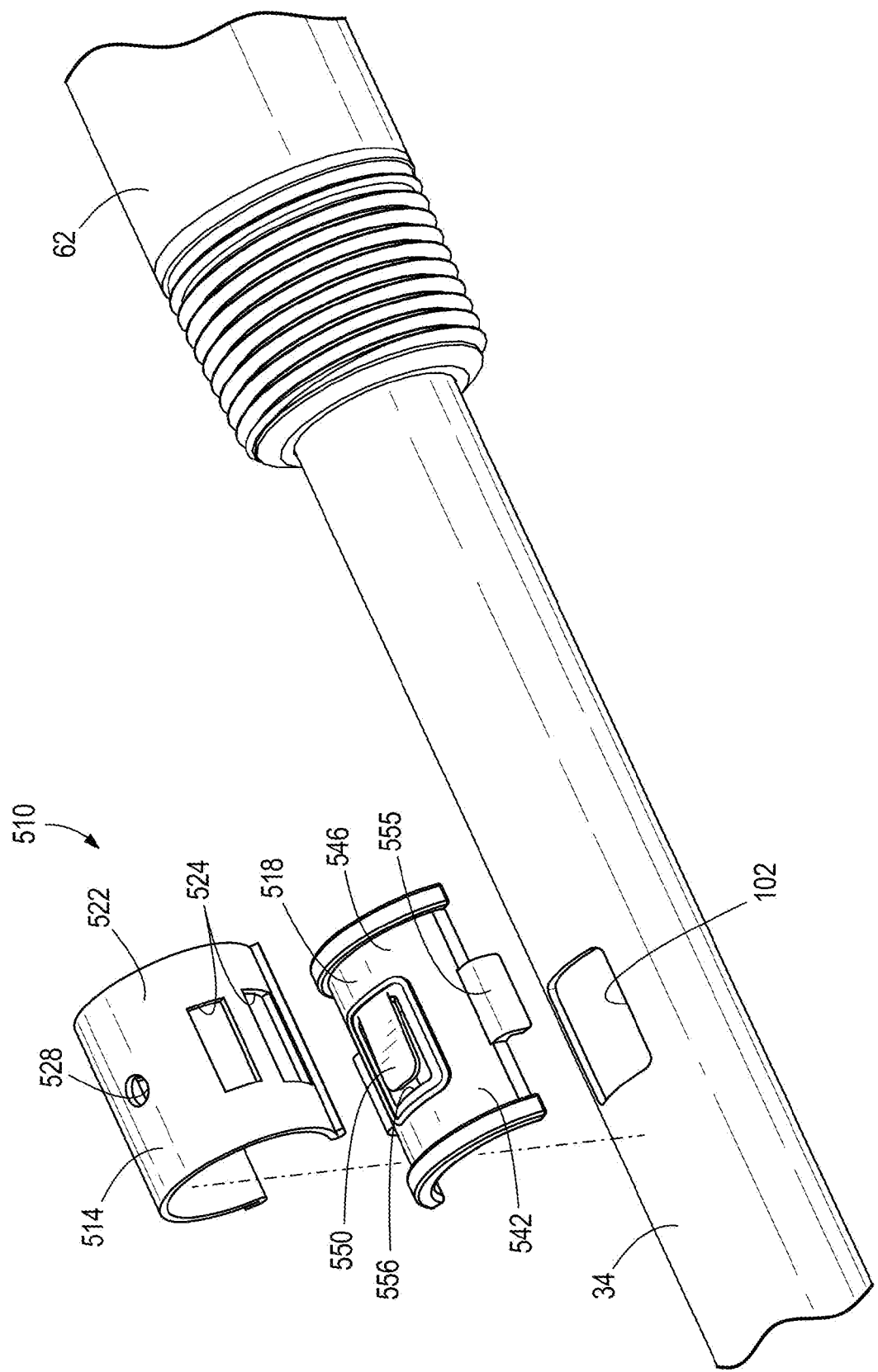
FIG. 17 is an exploded view of the cold water egress prevention mechanism of FIG. 16.

FIGS. 16-17 illustrate yet another exemplary embodiment of a cold water egress prevention mechanism 510 for the dip tube assembly 90, with like components and features as the embodiment of the cold water egress prevention mechanism 410 shown in FIGS. 13-15 being labeled with like reference numerals plus "100." The cold water egress prevention mechanism 510 is similar to the cold water egress prevention mechanism 410 and, accordingly, the discussion of the cold water egress prevention mechanism 410 above similarly applies to the cold water egress prevention mechanism 510 and is not restated. Rather, only differences between the cold water egress prevention mechanism 410 and the cold water egress prevention mechanism 510 are specifically noted herein, such as differences in the configuration of the dip tube assembly, the locking member, and the elastomeric membrane.

The cold water egress prevention mechanism 510 is securably coupled to the elongated body 74 of the dip tube 34 (rather than the extension 466 of the connector 62 as in the embodiment of the cold water egress prevention mechanism 410 of FIGS. 13-15). The cold water egress prevention mechanism 510 is positioned exterior to the dip tube 34. In addition, the anti-siphon orifice 102 extends through a wall of the elongated body 74 of the dip tube 34. The illustrated anti-siphon orifice 102 has a rectangular shape. Similar to the cold water egress prevention mechanism 410 described above, the anti-siphon orifice 102 may be referred to as an 'oversized' anti-siphon orifice 102

The cold water egress prevention mechanism 510 includes the locking member 514 and the elastomeric membrane 518. The locking member 514 is configured to couple the elastomeric membrane 518 to the exterior of the dip tube 34. The locking member 514 includes a base 522, and a plurality of holes 524, 528 extending through the base 522. One or more of the holes 524 may be used for clamping the elastomeric membrane 518 to the dip tube 34. The remaining hole 528 of the locking member 524 is configured to align with the anti-siphon orifice 102.

The locking member 514 is configured as a clamp. In the illustrated embodiment, the locking member 514 is a stainless-steel clamp (i.e., formed metal part). In other embodiments, the locking member 514 may be a molded plastic part for securing the elastomeric membrane 518 to the dip tube 34. The dip tube 34 has an outer diameter D3 (FIG. 16), and the locking member 514 extends radially around (i.e., surrounds) more than half of the outer diameter D3 of the dip tube 34. Furthermore, the locking member 514 includes a spring mechanism. In particular, the locking member 514 is formed with a spring tension that is applied as a clamping force to the elastomeric membrane 518 when the cold water egress prevention mechanism 510 is assembled together. The locking member 514 may snap onto or otherwise lock onto the dip tube 34. As such, the locking member 514 utilizes spring tension to secure the elastomeric membrane 518 to the elongated body 74 of the dip tube 34.

With reference to FIG. 17, the elastomeric membrane 518 of the cold water egress prevention mechanism 510 includes a body 542 having a first section 546 and a second section 550. In the illustrated embodiment, the first section 546 includes two projections 555 each of which is received in one of the holes 524 of the locking member 514. As such, the holes 524 and the projections 555 of the cold water egress prevention mechanism 510 are configured to locate the elastomeric membrane 518 relative to the locking member 514. The first section 546 of the elastomeric membrane 518 is positioned (e.g., sandwiched) between the exterior of the dip tube 34 and the locking member 514.

The first section 546 further includes a cutout 556. The second section 550 of the elastomeric membrane 518 is movably positioned within the cutout 546. The second section 550 is sized to be at least partially received in the anti-siphon orifice 102. In addition, the second section 550 is sized to be greater than a size of the hole 528 of the locking member 514. The second section 550 of the elastomeric membrane 518 is movable (e.g., pivotable or bendable) between a first position in which the second section 550 is pressed against an inner side of the locking member 514 such that the second section 550 is positioned over or otherwise covers the hole 528 of the locking member 514, and a second position in which the second section 550 is received in the anti-siphon orifice 102.

During operation, when the second section 550 of the elastomeric membrane 518 is in the first position, the elastomeric membrane 518 is operable to block fluid flow through the anti-siphon orifice 102. When the second section 550 of the elastomeric membrane 518 is in the second position, the elastomeric membrane 518 is operable to allow fluid flow through the anti-siphon orifice 102. The elastomeric membrane 518 is movable based on a pressure at the inlet end 78 of the dip tube 34 relative to an exterior of the dip tube 34 adjacent to the anti-siphon orifice 102 as discussed above with regard to the cold water egress prevention mechanism 410 of FIGS. 13-15. In addition to the pressure differentials that cause the second section 550 to lay flat against the hole 528 or pull away from the hole 528, the second section 550 extends in a downstream direction during a hot water draw and in an upstream direction during a siphon event which leads to similar action as described with respect to the embodiments discussed above.

Figure 18:
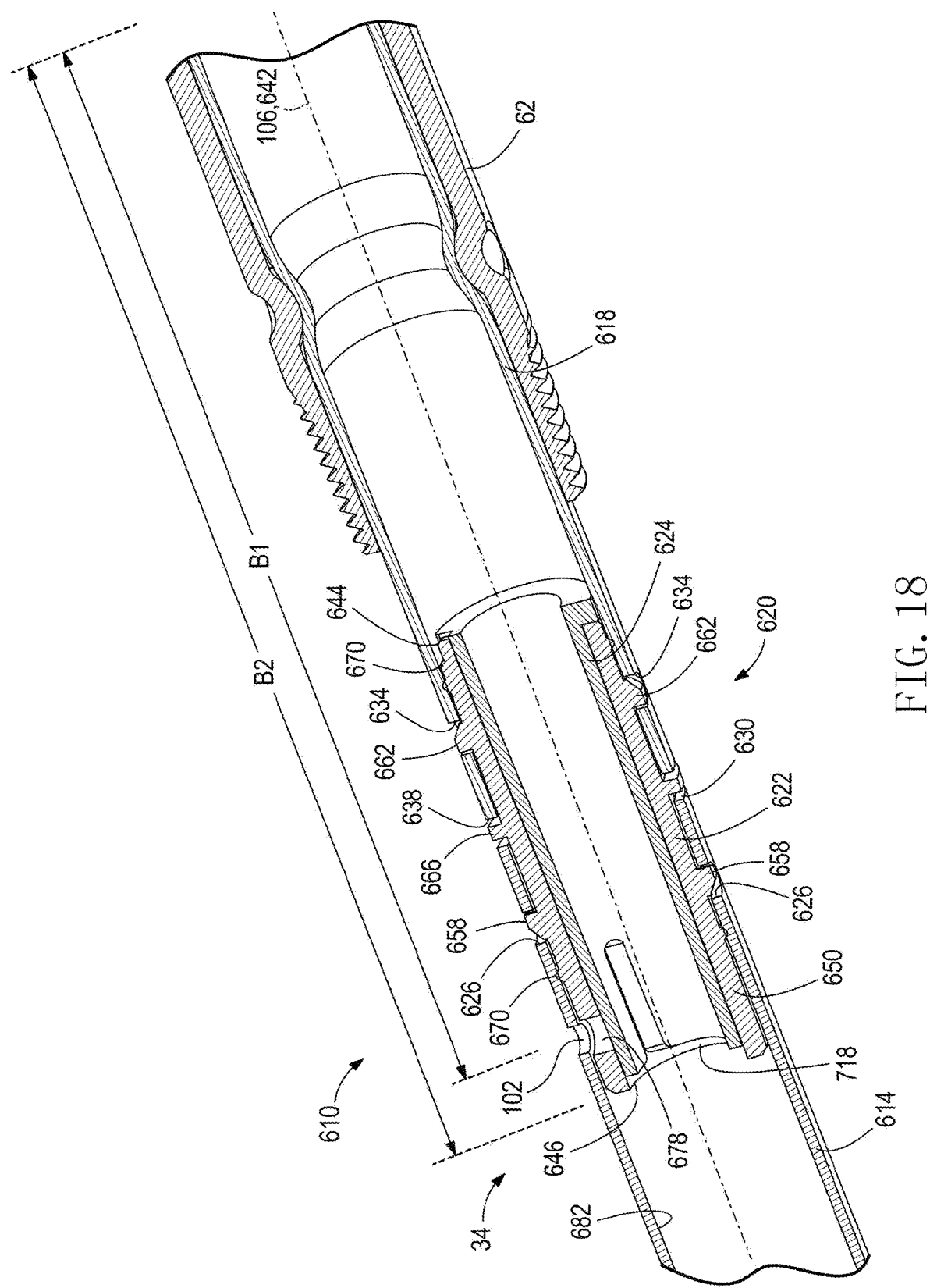
FIG. 18 is a cross-sectional view of a portion of a dip tube assembly including a cold water egress prevention mechanism according to a seventh embodiment.
Figure 19:
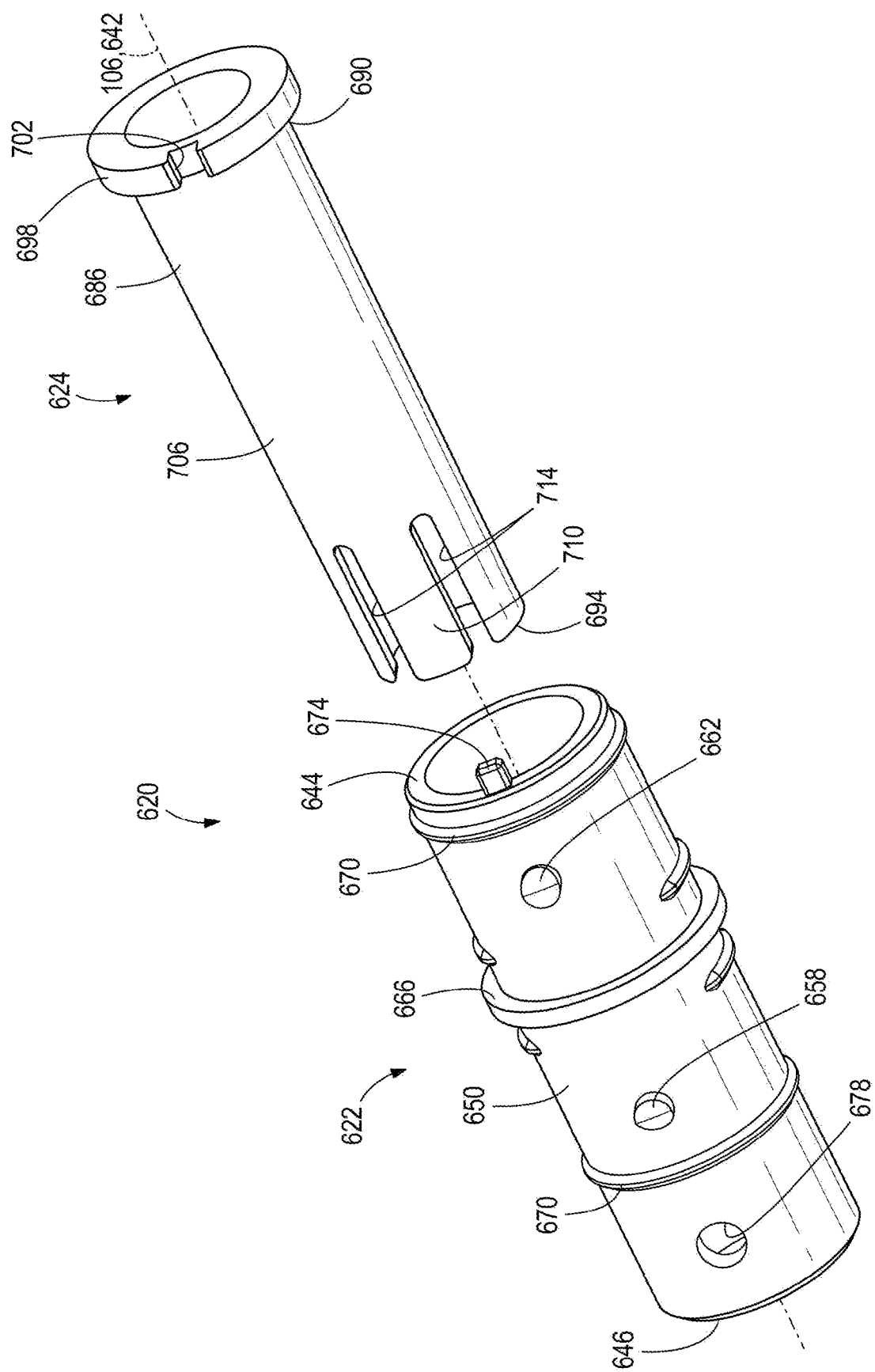
FIG. 19 is an exploded view of the cold water egress prevention mechanism of FIG. 18.
Figure 20:
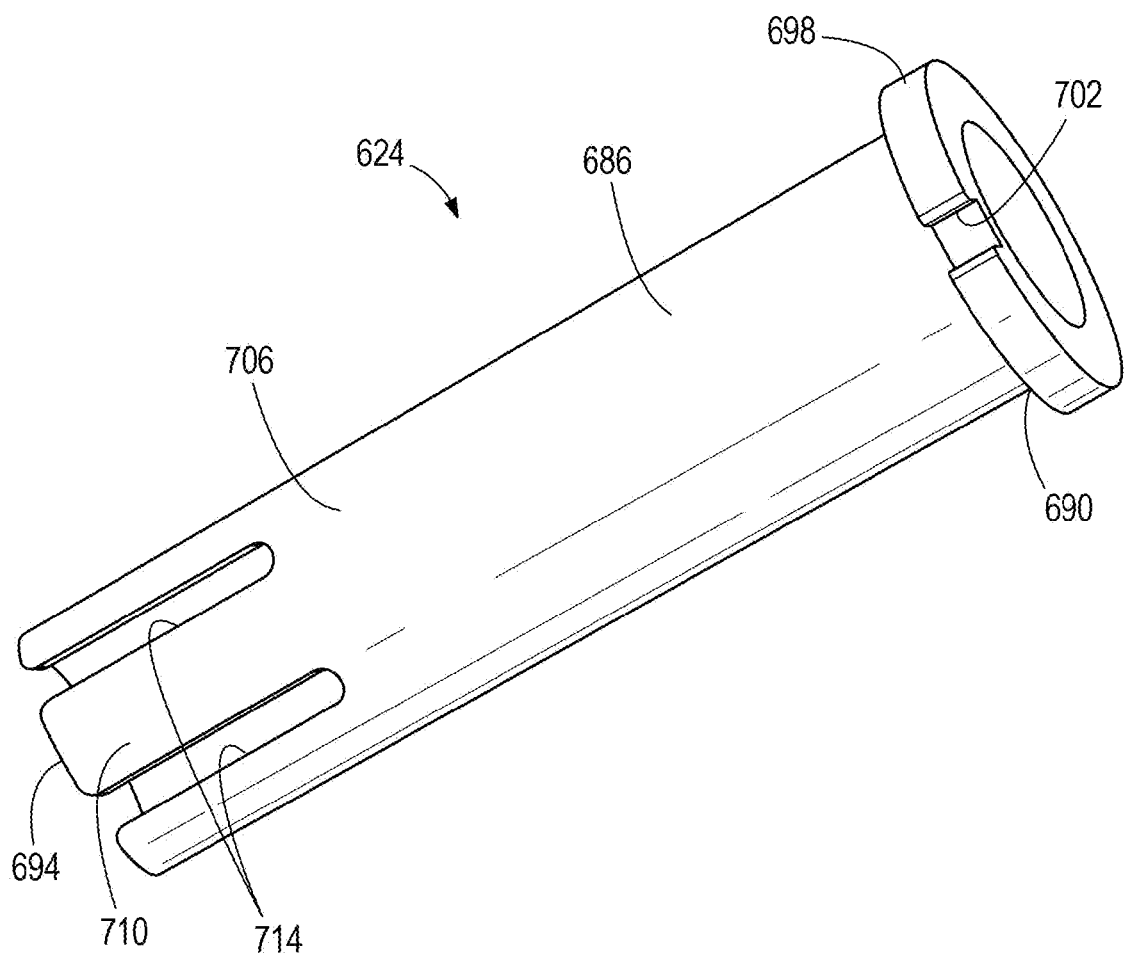
FIG. 20 is a perspective view of an elastomeric membrane of the cold water egress prevention mechanism of FIG. 19.

FIGS. 18-20 illustrate yet still another exemplary embodiment of a cold water egress prevention mechanism 610 for the dip tube assembly 90. The illustrated dip tube 34 is divided into a first body portion 614 and a second body portion 618. In other embodiments, the first body portion 614 is the entire dip tube 34 and the second body portion is an extension of the connector 62. The cold water egress prevention mechanism 610 includes a third body portion 620 coupled between the first and second body portions 614, 618, respectively. The third body portion 620 includes an insert 622 and an elastomeric membrane 624.

With reference to FIG. 18, the first body portion 614 includes the outlet end 82 of the dip tube 34 and the anti-siphon orifice 102. In addition, the first body portion 614 includes a first pair of diametrically opposed holes 626 extending through a wall of the first body portion 614. The first pair of diametrically opposed holes 626 are positioned between the anti-siphon orifice 102 and an end 630 of the first body portion 614 opposite the outlet end 82.

The second body portion 618 includes the inlet end 78. In addition, the second body portion 618 is coupled to the connector 62 of the water heater 10. The second body portion 618 further includes second pair of diametrically opposed holes 634 extending through a wall of the second body portion 618. The second pair of diametrically opposed holes 634 are positioned between the connector 62 and an end 638 of the second body portion 618 opposite the inlet end 78.

With reference to FIG. 18, the insert 622 of the third body portion 620 includes a central axis 642 extending therethrough. The central axis 642 is colinear with the longitudinal axis 106 of the dip tube assembly 90. The insert 622 extends between a first end 644 and a second end 646 opposite the first end 644.

The insert 622 includes a body 650 having first and second pairs of diametrically opposed projections 658, 662, an annular flange 666, a plurality of engaging members 670, a protrusion 674, and a port 678. The first and second pairs of diametrically opposed projections 658, 662 extend radially outward from the body 650 relative to the central axis 642. The first and second pairs of diametrically opposed projections 658, 662 are configured to be received in the first and second pairs of diametrically opposed holes 626, 634, respectively, of the first and second body portions 614, 618 of the dip tube 34. In other embodiments, the body 650 may include the holes rather than the projections, or a combination of projections and holes, and the first and second body portions 614, 618 include the other of the holes/projections. The holes 626, 634 and the projections 658, 662 are provided for coupling the insert 622 to the first and second body portions 614, 618, respectively. In other embodiments, the insert 622 may include one or more holes/projections. In further other embodiments, the insert 622 may include similar or other coupling features (e.g., crimping, heat-staked, and the like) for coupling the first body portion 614, the second body portion 618, and the insert 622 together.

With reference to FIGS. 18 and 19, the annular flange 666 extends radially outward from the body 650 relative to the central axis 642. The annular flange 666 is positioned axially between the first pair of diametrically opposed projections 658 and the second pair of diametrically opposed projections 662. Each end 630, 638 of the first body portion 614 and the second body portion 618, respectively, is configured to abut against or otherwise contact opposite sides of the annular flange 666 when the cold water egress prevention mechanism 610 and the dip tube 34 are assembled together. The annular flange 666 is configured to limit axial movement of the first body portion 614 and the second body portion 618 relative to the insert 622. More specifically, the annular flange 666 limits the axial position of the first body portion 614 and the second body portion 618 relative to the insert 622.

The engaging members 670 of the insert 622 extend radially outward from the body 650 relative to the central axis 642. A first engaging member 670 is axially positioned between the first pair of diametrically opposed projections 658 and the second end 646 of the insert 622 relative to the central axis 642. A second engaging member 670 is positioned axially between the second pair of diametrically opposed projections 662 and the first end 644 of the insert 622 relative to the central axis 642. The engaging members 670 are configured to engage with an inner surface 682 (FIG. 18) of the dip tube 34. For example, the first engaging member 670 is engageable with the inner surface 682 of the first body portion 614 and the second engaging member 670 is engageable with the inner surface 682 of the second body portion 618. The engaging members 670 are configured as friction fit rings to sealingly couple the first body portion 614, the second body portion 618, and the insert 622 together. As such, each of the engaging members 670 may be configured as a sealing member to inhibit or prevent fluid from flowing between the insert 622 and the inner surfaces 682 of the first and second body portions 614, 618, respectively.

The protrusion 674 is positioned at the first end 644 of the insert 622. In addition, the protrusion 674 extends axially outward from the body 650 relative to the central axis 642. The port 678 is positioned axially between the engaging member 670 and the second end 646 of the insert 622. The port 678 extends through a wall of the body 650 of the insert 622. The port 678 of the insert 622 is configured to align with the anti-siphon orifice 102, as further discussed below. The illustrated insert 622 may be formed by injection molding.

With reference to FIG. 20, the elastomeric membrane 624 of the cold water egress prevention mechanism 610 includes a body 686 extending between a first end 690 and a second end 694. The elastomeric membrane 624 further includes an annular flange 698 positioned adjacent the first end 690. The annular flange 698 defines a cutout 702. The cutout 702 is positioned at a predetermined circumferential position of the annular flange 698 relative to the central axis 642 of the insert 622. The cutout 702 is configured to receive the protrusion 674 of the insert 622. In other embodiments, the insert 622 may include the cutout rather than the protrusion, or a combination of cutouts and protrusions, and the elastomeric membrane 624 includes the other of the cutouts/protrusions. The cutout 702 and the protrusion 674 are provided for aligning the insert 622 and the elastomeric membrane 624 during assembly. Furthermore, the annular flange 698 is configured to abut against or otherwise contact the first end 644 of the insert 622 after assembly.

The body 686 of the elastomeric membrane 624 includes a first section 706 and a second section 710. The first section 706 includes two notches 714 extending from the second end 694 toward the first end 690 of the body 686. The notches 714 define the second section 710. More specifically, the second section 710 is positioned circumferentially between the notches 714. The second section 710 is configured to selectively seal against fluid flow through the anti-siphon orifice 102, as further discussed below.

The elastomeric membrane 624 is positioned within the insert 622. In addition, the elastomeric membrane 624 is arranged within the internal volume of the dip tube 34 by the insert 622. The elastomeric membrane 624 is formed by an elastomeric material (e.g., rubber). The second section 710 of the elastomeric membrane 624 is movable (e.g., pivotable or bendable) between a first position (FIG. 18) in which the second section 710 is positioned over or otherwise covers the port 678 and the anti-siphon orifice 102, and a second position in which the second section 710 is moved away from the anti-siphon orifice 102. More specifically, the second section 710 is movable radially away from an inner wall 718 (FIG. 18) of the insert 622 toward the central axis 642. Accordingly, the seconds section 710 is configured as a flap.

When the cold water egress prevention mechanism 610 and the dip tube 34 are assembled together, the elastomeric membrane 624 is positioned within the insert 622. In addition, the first end 644 of the insert 622 is received in the second body portion 618, and the second end 646 of the insert 622 is received in the first body portion 614 (FIG. 18). After assembly, the elastomeric membrane 624 is arranged in the vicinity of the anti-siphon orifice 102. More specifically, the elastomeric membrane 624 extends axially within the insert 622 such that the second section 710 of the elastomeric membrane 624 covers the port 678 and the anti-siphon orifice 102 within the dip tube 34. In other embodiments, the third body portion 620 may only include the elastomeric membrane 624.

With particular reference to FIG. 18, the anti-siphon orifice 102 is located at a first distance B1 from the inlet end 78 of the dip tube 34. In addition, the second end 694 of the elastomeric membrane 622 extends to a second distance B2 from the inlet end 78. The second distance B2 is greater than the first distance B1. As such, the second section 710 of the elastomeric membrane 624 is sized (and positioned) to extend axially beyond the position of the anti-siphon orifice 102 when the cold water egress prevention mechanism 610 and the dip tube 34 are assembled together.

During operation, when the second section 710 of the elastomeric membrane 624 is in the first position, the elastomeric membrane 624 is operable to block fluid flow through the anti-siphon orifice 102. When the second section 710 of the elastomeric membrane 624 is in the second position, the elastomeric membrane 624 is operable to allow fluid flow through the anti-siphon orifice 102.

The elastomeric membrane 624 is movable based on a pressure at the inlet end 78 of the dip tube 34 relative to an exterior of the dip tube 34 adjacent to the anti-siphon orifice 102. In particular, the elastomeric membrane 624 is operable to block fluid flow through the anti-siphon orifice 102 when a pressure at the inlet end 78 is greater than a pressure at the exterior of the dip tube 34 adjacent to the anti-siphon orifice 102 (e.g., during a hot water draw), and to allow fluid flow through the anti-siphon orifice 102 when a pressure at the inlet end 78 is less than a pressure at the exterior of the dip tube 34 adjacent to the anti-siphon orifice 102 (e.g., during a siphoning event). In the illustrated embodiment, the second section 710 of the elastomeric membrane 624 is in the first position when the pressure at the inlet end 78 is greater than the pressure at the exterior of the dip tube 34 adjacent to the anti-siphon orifice 102. The second section 710 of the elastomeric membrane 624 is movable from the first position toward the second position when the pressure at the inlet end 78 is less than the pressure at the exterior of the dip tube 34 adjacent to the anti-siphon orifice 102.

Accordingly, each of the cold water egress prevention mechanisms 110, 210, 310, 410, 510, 610, 810 described above are integrated with a dip tube for selectively minimizing or preventing cold water from entering the top portion 54 of the interior space 18 of the tank 14 during a hot water draw by the anti-siphon orifice 102, but preventing the siphoning of water from the tank 14 during a siphoning event.

Thus, the invention is to cover all modifications, equivalents, and alternatives falling within the spirit and scope of the invention as defined by the following claims.

What is claimed is:

1. A water heater dip tube comprising:
an elongated body having an inlet end and an outlet end;
an inner volume arranged within the elongated body and providing a first fluid flow path extending through the inner volume between the inlet end and the outlet end;
an anti-siphon orifice arranged along the elongated body proximate the inlet end and extending through a wall of the elongated body to provide a second fluid flow path between the inner volume and an exterior of the dip tube; and
an elastomeric membrane secured to the elongated body and arranged in the vicinity of the anti-siphon orifice and operable to block fluid flow through the anti-siphon orifice when a pressure at the inlet end is greater than a pressure at the exterior of the dip tube adjacent to the anti-siphon orifice, and to allow fluid flow through the anti-siphon orifice when a pressure at the inlet end is less than a pressure at the exterior of the dip tube adjacent to the anti-siphon orifice.

2. The water heater dip tube of claim 1, further comprising a clamp that secures the elastomeric membrane to the elongated body.

3. The water heater dip tube of claim 2, wherein the clamp is a formed metal part or a molded plastic part.

4. The water heater dip tube of claim 2, wherein the clamp includes a spring mechanism to secure the elastomeric membrane to the elongated body.

5. The water heater dip tube of claim 2, wherein the clamp is joined to the elongated body by deforming a portion of at least one of the clamp and the elongated body.

6. The water heater dip tube of claim 2, wherein the anti-siphon orifice includes a first portion
of the orifice extending through the wall of the elongated body, a second portion of the orifice extending through the membrane and aligned with the first portion of the orifice, and a third portion of the orifice extending through the clamp and aligned with the first and second portions of the orifice.

7. The water heating dip tube of claim 6, wherein the third portion of the orifice is smaller in size than the first portion of the orifice.

8. The water heating dip tube of claim 7, wherein the third portion of the orifice is a round hole having a diameter of at least one eighth of an inch.

9. The water heating dip tube of claim 6, wherein the second portion of the orifice is arranged between the first portion of the orifice and the third portion of the orifice along the second fluid flow path.

10. The water heating dip tube of claim 6, wherein the membrane includes a portion that is disposed against the clamp to block the flow of fluid through the third portion of the orifice when a pressure at the inlet end is greater than a pressure at the exterior of the dip tube adjacent to the anti-siphon orifice, and that is deflected at least partially into the first portion of the orifice to allow fluid flow through the anti-siphon orifice when a pressure at the inlet end is less than a pressure at the exterior of the dip tube adjacent to the anti-siphon orifice.

11. The water heater dip tube of claim 1, wherein the elastomeric membrane is arranged within the internal volume.

12. A water heater dip tube comprising:
an elongated body having an inlet end and an outlet end;
an inner volume arranged within the elongated body and providing a fluid flow path extending through the inner volume between the inlet end and the outlet end;
an anti-siphon orifice arranged along the elongated body proximate the inlet end and extending through a wall of the elongated body; and a flow channel forming part of the inner volume and connecting the anti-siphon orifice to a remainder of the inner volume, wherein the flow channel is not along the fluid flow path and is configured to prevent flow through the anti-siphon orifice when fluid is flowing along the fluid flow path from the inlet end to the outlet end and to allow flow through the anti-siphon orifice in the absence of fluid flow along the fluid flow path from the inlet end to the outlet end, wherein the elongated body includes a first body portion and second body portion, the second body portion being joined to the first body portion to form the flow channel, and wherein the elongated body further includes a third body portion joined to one of the first body portion and the second body portion, and wherein the inlet end is provided by the third body portion.

13. The water heater dip tube of claim 12, wherein the flow channel is an annulus.

14. The water heater dip tube of claim 12, wherein the outlet end and the anti-siphon orifice are provided by the first body portion.

15. A water heater dip tube comprising:
a first body portion providing an inlet end of the dip tube;
a second body portion providing an outlet end of the dip tube;
a third body portion joined to the first body portion and the second body portion, a first end of the third body portion being received within the first body portion and a second end of the third body portion being received within the second body portion;
an anti-siphon orifice extending through a wall of the second body portion, wherein the anti-siphon orifice is located at a first distance from the inlet end and wherein the second end of the third body portion extends to a second distance from the inlet end, the second distance being greater than the first distance, wherein the anti-siphon orifice extends through a wall of the third body portion; and
an elastomeric membrane at least partially arranged within the third body portion and operable to block fluid flow through the anti-siphon orifice when a pressure at the inlet end is greater than a pressure at the exterior of the dip tube adjacent to the anti-siphon orifice, and to allow fluid flow through the anti-siphon orifice when a pressure at the inlet end is less than a pressure at the exterior of the dip tube adjacent to the anti-siphon orifice.

16. A water heater dip tube comprising:
a first body portion providing an inlet end of the dip tube;
a second body portion providing an outlet end of the dip tube;
a third body portion joined to the first body portion and the second body portion, a first end of the third body portion being received within the first body portion and a second end of the third body portion being received within the second body portion;
an anti-siphon orifice extending through a wall of the second body portion, wherein the anti-siphon orifice is located at a first distance from the inlet end and wherein the second end of the third body portion extends to a second distance from the inlet end, the second distance being greater than the first distance; and
an annular flow channel arranged between the second body portion and the third body portion, wherein the anti-siphon orifice is in fluid communication with the annular flow channel.

* * * * *